United States Patent
Abotabl et al.

(10) Patent No.: US 12,408,177 B2
(45) Date of Patent: Sep. 2, 2025

(54) TIME DOMAIN RESOURCE ALLOCATION SCHEDULING MULTIPLE TRANSMISSIONS ACROSS SUBBANDS

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 17/891,940

(22) Filed: Aug. 19, 2022

(65) Prior Publication Data

US 2024/0064752 A1 Feb. 22, 2024

(51) Int. Cl.
*H04B 7/00* (2006.01)
*H04L 5/14* (2006.01)
*H04W 72/23* (2023.01)

(52) U.S. Cl.
CPC .............. *H04W 72/23* (2023.01); *H04L 5/14* (2013.01)

(58) Field of Classification Search
CPC .... H04W 72/23; H04W 72/0446; H04L 5/14; H04L 5/0044
USPC ........................................................ 370/277
See application file for complete search history.

(56) References Cited

U.S. PATENT DOCUMENTS

| | | | |
|---|---|---|---|
| 2021/0352696 A1* | 11/2021 | Yoshimura | H04L 1/1896 |
| 2021/0360664 A1 | 11/2021 | Fakoorian et al. | |
| 2021/0392478 A1* | 12/2021 | Park | H04L 27/261 |
| 2022/0104245 A1 | 3/2022 | Xu et al. | |
| 2023/0163937 A1* | 5/2023 | Awadin | H04L 5/14 |
| | | | 370/329 |
| 2023/0276438 A1* | 8/2023 | Rudolf | H04L 5/14 |
| 2024/0039655 A1* | 2/2024 | Rudolf | H04L 1/0016 |

OTHER PUBLICATIONS

International Search Report and Written Opinion—PCT/US2023/070723—ISA/EPO—Nov. 2, 2023.

* cited by examiner

*Primary Examiner* — Chuong T Ho
(74) *Attorney, Agent, or Firm* — Holland & Hart LLP

(57) ABSTRACT

Methods, systems, and devices for wireless communication are described. A user equipment (UE) may receive a grant scheduling communications during a full-duplex slot, the communications including a first communications using a first one or more resource block sets and a second communications using a second one or more resource block sets. The UE may identify, based at least in part on a time domain resource allocation field indicated in the grant, a first frequency resource for the first one or more resource block sets and a second frequency resource for the second one or more resource block sets. The UE may perform the communications during the full-duplex slot and using the first frequency resource and the second frequency resource.

30 Claims, 18 Drawing Sheets

TIME DOMAIN RESOURCE ALLOCATION SCHEDULING MULTIPLE TRANSMISSIONS ACROSS SUBBANDS

FIELD OF TECHNOLOGY

The following relates to wireless communication, including time domain resource allocation scheduling multiple transmissions across subbands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support time domain resource allocation (TDRA) scheduling multiple transmissions across subbands. For example, the described techniques provide for a single grant that schedules multiple wireless communications during a full-duplex (FD) slot. A network entity transmits a grant to a user equipment (UE). The DCI grant schedules communications during a FD slot (e.g., a subband full-duplex (SBFD) or an in-band full-duplex (IBFD) slot). The communications scheduled during the FD slot may include a first communications (e.g., uplink or downlink communications) and a second communications (uplink or downlink communications), although more than two communications may be scheduled during the FD slot. Communications may also be scheduled in one or more half-duplex slots by the grant. The UE uses the TDRA field indicated in the grant to identify or determine a first frequency resource for a first one or more resource block (RB) sets (e.g., set(s) of RBs used for the first communications) and a second frequency resource for a second one or more RB sets (e.g., set(s) of RBs used for the second communications). The TDRA indication signals that the slot index associated with each communication is the same (e.g., shared). The network entity schedules physical uplink or downlink shared channel (PxSCH) communications in different frequency resources during the FD slot and configures the TDRA field in the DCI grant to carry an indication of the RB set(s) of each frequency resource. Accordingly, the UE and network entity perform the wireless communications during the FD slot using the frequency resources identified by the TDRA field.

A method for wireless communications at a UE is described. The method may include receiving a grant scheduling communications during a FD slot, the communications including a first communications using a first one or more RB sets and a second communications using a second one or more RB sets, identifying, based on a TDRA field indicated in the grant, a first frequency resource for the first one or more RB sets and a second frequency resource for the second one or more RB sets, and performing the communications during the FD slot and using the first frequency resource and the second frequency resource.

An apparatus for wireless communications at a UE is described. The apparatus may include a processor, memory coupled with the processor, and instructions stored in the memory. The instructions may be executable by the processor to cause the apparatus to receive a grant scheduling communications during a FD slot, the communications including a first communications using a first one or more RB sets and a second communications using a second one or more RB sets, identify, based on a TDRA field indicated in the grant, a first frequency resource for the first one or more RB sets and a second frequency resource for the second one or more RB sets, and perform the communications during the FD slot and using the first frequency resource and the second frequency resource.

Another apparatus for wireless communications at a UE is described. The apparatus may include means for receiving a grant scheduling communications during a FD slot, the communications including a first communications using a first one or more RB sets and a second communications using a second one or more RB sets, means for identifying, based on a TDRA field indicated in the grant, a first frequency resource for the first one or more RB sets and a second frequency resource for the second one or more RB sets, and means for performing the communications during the FD slot and using the first frequency resource and the second frequency resource.

A non-transitory computer-readable medium storing code for wireless communications at a UE is described. The code may include instructions executable by a processor to receive a grant scheduling communications during a FD slot, the communications including a first communications using a first one or more RB sets and a second communications using a second one or more RB sets, identify, based on a TDRA field indicated in the grant, a first frequency resource for the first one or more RB sets and a second frequency resource for the second one or more RB sets, and perform the communications during the FD slot and using the first frequency resource and the second frequency resource.

Some examples of the method, apparatuses, and non-transitory computer-readable medium described herein may further include operations, features, means, or instructions for identifying, based on the TDRA field, a first slot index for the first communications and a second slot index for the second communications and determining that the grant schedules communications during the FD slot based on the first slot index and the second slot index indicating a shared slot index.

Some examples of the method, apparatuses, and non-transitory computer-readable medium described herein may further include operations, features, means, or instructions for identifying, based on the grant, a first redundancy version and a first codeword for the first communications and a second redundancy version and a second codeword for the second communications and determining that the second communications may be a repetition of the first communications based on the first redundancy version and the second redundancy version being a same redundancy version and the first codeword and the second codeword being a same codeword.

Some examples of the method, apparatuses, and non-transitory computer-readable medium described herein may further include operations, features, means, or instructions for identifying, based on the grant, a first redundancy version and a first codeword for the first communications and a second redundancy version and a second codeword for the second communications and determining that the first communications and the second communications may be different communications based on the first redundancy version and the second redundancy version being different redundancy versions and the first codeword and the second codeword being different codewords.

Some examples of the method, apparatuses, and non-transitory computer-readable medium described herein may further include operations, features, means, or instructions for identifying, based on the TDRA field, a first starting symbol during the FD slot for the first communications and a second starting symbol during the FD slot for the second communications, where the first starting symbol and the second starting symbol include a same starting symbol or a different starting symbol.

Some examples of the method, apparatuses, and non-transitory computer-readable medium described herein may further include operations, features, means, or instructions for identifying, based on a frequency domain resource allocation field indicated in the grant, a first starting RB of the first one or more RB sets within the first frequency resource to use for the first communications and identifying, based on the first starting RB, a second starting RB of the second one or more RB sets within the second frequency resource to use for the second communications.

Some examples of the method, apparatuses, and non-transitory computer-readable medium described herein may further include operations, features, means, or instructions for identifying, based on a first portion of a frequency domain resource allocation field indicated in the grant, a first starting RB of the first one or more RB sets within the first frequency resource to use for the first communications and identifying, based on a second portion of frequency domain resource allocation field, a second starting RB of the second one or more RB sets within the second frequency resource to use for the second communications.

Some examples of the method, apparatuses, and non-transitory computer-readable medium described herein may further include operations, features, means, or instructions for identifying, based on the grant, the first communications and the second communications scheduled during the FD slot based on a shared slot index associated with the first communications and the second communications and a third communications scheduled during a half-duplex slot based on a slot index that may be different from the shared slot index.

In some examples of the method, apparatuses, and non-transitory computer-readable medium described herein, the first frequency resource and the second frequency resource include different subbands during a SBFD or include overlapping frequency resources during an IBFD slot.

A method for wireless communications at a network entity is described. The method may include identifying, for a UE, a first frequency resource for a first one or more RB sets associated with a first communications during a FD slot and a second frequency resource for a second one or more RB sets associated with a second communications during the FD slot, transmitting a grant to the UE scheduling the first communications and the second communications during the FD slot, the grant including a TDRA field identifying the first frequency resource and the second frequency resource, and performing the communications with the UE during the FD slot and using the first frequency resource and the second frequency resource.

An apparatus for wireless communications at a network entity is described. The apparatus may include a processor, memory coupled with the processor, and instructions stored in the memory. The instructions may be executable by the processor to cause the apparatus to identify, for a UE, a first frequency resource for a first one or more RB sets associated with a first communications during a FD slot and a second frequency resource for a second one or more RB sets associated with a second communications during the FD slot, transmit a grant to the UE scheduling the first communications and the second communications during the FD slot, the grant including a TDRA field identifying the first frequency resource and the second frequency resource, and perform the communications with the UE during the FD slot and using the first frequency resource and the second frequency resource.

Another apparatus for wireless communications at a network entity is described. The apparatus may include means for identifying, for a UE, a first frequency resource for a first one or more RB sets associated with a first communications during a FD slot and a second frequency resource for a second one or more RB sets associated with a second communications during the FD slot, means for transmitting a grant to the UE scheduling the first communications and the second communications during the FD slot, the grant including a TDRA field identifying the first frequency resource and the second frequency resource, and means for performing the communications with the UE during the FD slot and using the first frequency resource and the second frequency resource.

A non-transitory computer-readable medium storing code for wireless communications at a network entity is described. The code may include instructions executable by a processor to identify, for a UE, a first frequency resource for a first one or more RB sets associated with a first communications during a FD slot and a second frequency resource for a second one or more RB sets associated with a second communications during the FD slot, transmit a grant to the UE scheduling the first communications and the second communications during the FD slot, the grant including a TDRA field identifying the first frequency resource and the second frequency resource, and perform the communications with the UE during the FD slot and using the first frequency resource and the second frequency resource.

Some examples of the method, apparatuses, and non-transitory computer-readable medium described herein may further include operations, features, means, or instructions for identifying, based on the TDRA field, a first slot index for the first communications and a second slot index for the second communications, where the grant schedules communications during the FD slot based on the first slot index and the second slot index indicating a same slot index.

Some examples of the method, apparatuses, and non-transitory computer-readable medium described herein may further include operations, features, means, or instructions for identifying, based on the grant, a first redundancy version and a first codeword for the first communications and a second redundancy version and a second codeword for the second communications, where the second communications may be a repetition of the first communications based on the first redundancy version and the second redundancy version being a same redundancy version and the first codeword and the second codeword being a same codeword.

Some examples of the method, apparatuses, and non-transitory computer-readable medium described herein may further include operations, features, means, or instructions for identifying, based on the grant, a first redundancy version and a first codeword for the first communications and a second redundancy version and a second codeword for the second communications, where the first communications and the second communications may be different communications based on the first redundancy version and the second redundancy version being different redundancy versions and the first codeword and the second codeword being different codewords.

Some examples of the method, apparatuses, and non-transitory computer-readable medium described herein may further include operations, features, means, or instructions for identifying, based on the TDRA field, a first starting symbol during the FD slot for the first communications and a second starting symbol during the FD slot for the second communications, where the first starting symbol and the second starting symbol include a same starting symbol or a different starting symbol.

Some examples of the method, apparatuses, and non-transitory computer-readable medium described herein may further include operations, features, means, or instructions for identifying, based on a frequency domain resource allocation field indicated in the grant, a first starting RB of the first one or more RB sets within the first frequency resource to use for the first communications, where a second starting RB of the second one or more RB sets within the second frequency resource may be identified based on the first starting RB.

Some examples of the method, apparatuses, and non-transitory computer-readable medium described herein may further include operations, features, means, or instructions for identifying, based on a first portion of a frequency domain resource allocation field indicated in the grant, a first starting RB of the first one or more RB sets within the first frequency resource to use for the first communications and identifying, based on a second portion of frequency domain resource allocation field, a second starting RB of the second one or more RB sets within the second frequency resource to use for the second communications.

Some examples of the method, apparatuses, and non-transitory computer-readable medium described herein may further include operations, features, means, or instructions for identifying, based on the grant, the first communications and the second communications scheduled during the FD slot based on a shared slot index associated with the first communications and the second communications and a third communications scheduled during a half-duplex slot based on a slot index that may be different from the shared slot index.

In some examples of the method, apparatuses, and non-transitory computer-readable medium described herein, the first frequency resource and the second frequency resource include different subbands during a SBFD or include overlapping frequency resources during an IBFD slot.

DETAILED DESCRIPTION

Figure 1:
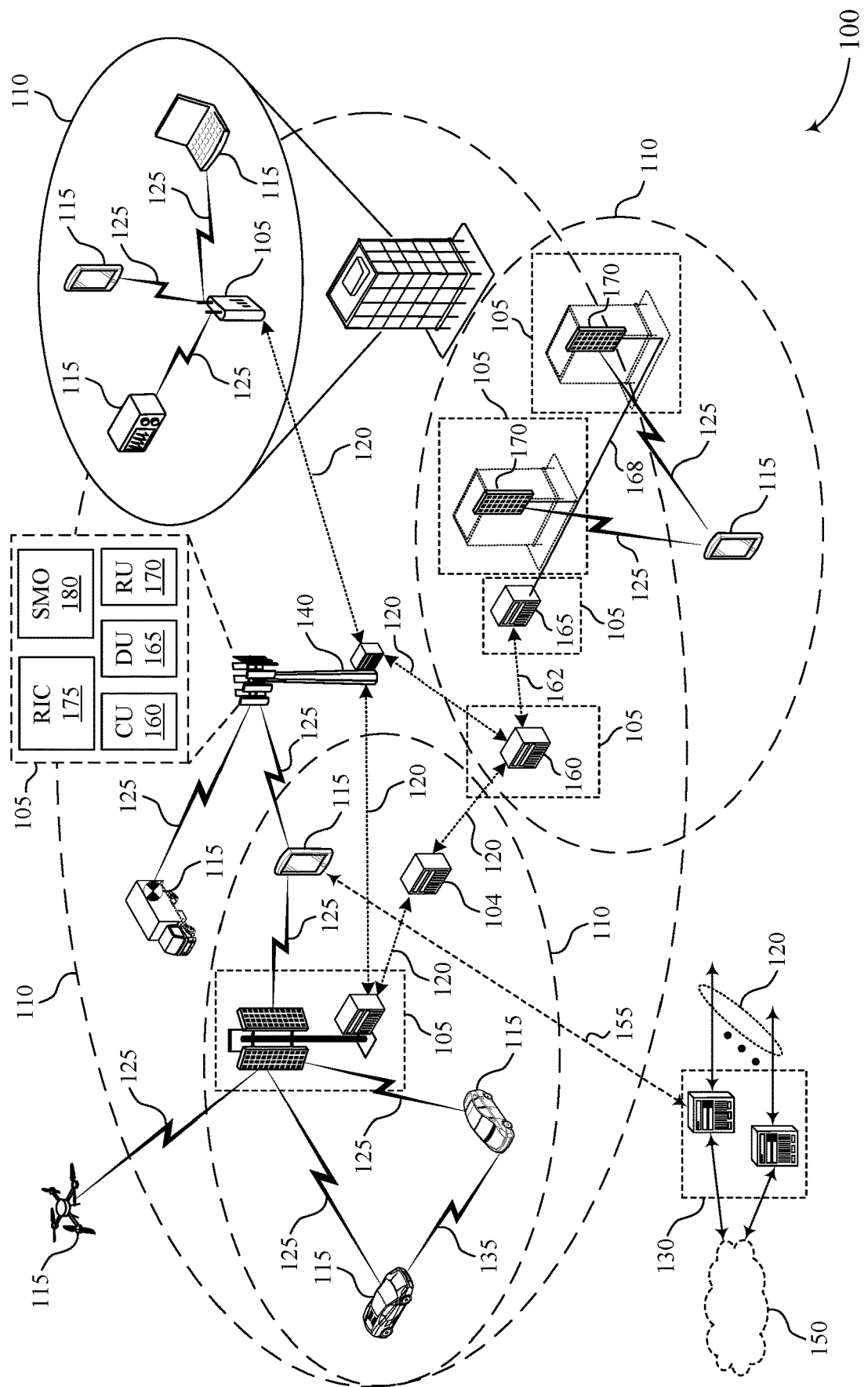
FIG. 1 illustrates an example of a wireless communications system that supports time domain resource allocation (TDRA) scheduling multiple transmissions across subbands in accordance with one or more aspects of the present disclosure.

Wireless networks may operate according to a grant-based protocol where a network entity manages resources (e.g., time, frequency, spatial, or code resources) used for wireless communications within the wireless network. For example, the network entity may transmit a grant to a user equipment (UE) that identifies the resources, as well as other parameters, to be used for the wireless communications within the network. These techniques support the network entity using a single transmission to send a single grant (e.g., one downlink control information (DCI) grant) scheduling wireless communications in one slot or scheduling wireless communications in multiple slots. However, advanced wireless networks may use full-duplex (FD) slots (e.g., subband full-duplex (SBFD) slots or intra-band full-duplex (IBFD) slot) where the frequency resources are divided into distinct subbands or overlapping frequencies. The FD slots support a UE performing multiple communications during the FD slots, such as concurrent (at least to some degree) downlink transmissions, uplink transmissions, or both uplink and downlink communications during the FD slots. Conventional networks do not provide a mechanism for a single DCI grant to schedule FD communications (e.g., multiple physical uplink or downlink shared channel (PxSCH) communications) during the FD slot.

Accordingly, aspects of the described techniques relate to improved methods, systems, devices, and apparatuses that support time domain resource allocation (TDRA) scheduling multiple transmissions across subbands. For example, the described techniques provide for a single grant that schedules multiple wireless communications during a FD slot. A network entity transmits a grant to a UE. The DCI grant schedules communications during a FD slot (e.g., a SBFD or an IBFD slot). The communications scheduled during the FD slot may include a first communications (e.g., uplink or downlink communications) and a second communications (uplink or downlink communications), although more than two communications may be scheduled during the FD slot. Communications may also be scheduled in one or more half-duplex slots by the grant. The UE uses a TDRA field indicated in the grant to identify or determine a first frequency resource for a first one or more resource block (RB) sets (e.g., set(s) of RBs used for the first communications) and a second frequency resource for a second one or more RB sets (e.g., set(s) of RBs used for the second communications). The TDRA indication signals that the slot index associated with each communication is the same (e.g., shared). The network entity schedules PxSCH communications in different frequency resources during the FD slot and configures the TDRA field in the DCI grant to carry an indication of the RB set(s) of each frequency resource. Accordingly, the UE and network entity perform the wireless communications during the FD slot using the frequency resources identified by the TDRA field.

Aspects of the disclosure are initially described in the context of wireless communications systems. Aspects of the disclosure are further illustrated by and described with reference to apparatus diagrams, system diagrams, and flowcharts that relate to TDRA scheduling multiple transmissions across subbands.

FIG. 1 illustrates an example of a wireless communications system 100 that supports TDRA scheduling multiple transmissions across subbands in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support TDRA scheduling multiple transmissions across subbands as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$, may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive a grant scheduling communications during a FD slot, the communications including a first communications using a first one or more RB sets and a second communications using a second one or more RB sets. The UE 115 may identify, based at least in part on a TDRA field indicated in the grant, a first frequency resource for the first one or more RB sets and a second frequency resource for the second one or more RB sets. The UE 115 may perform the communications during the FD slot and using the first frequency resource and the second frequency resource.

A network entity 105 may identify, for a UE 115, a first frequency resource for a first one or more RB sets associated with a first communications during a FD slot and a second frequency resource for a second one or more RB sets associated with a second communications during the FD slot. The network entity 105 may transmit a grant to the UE 115 scheduling the first communications and the second communications during the FD slot, the grant comprising a TDRA field identifying the first frequency resource and the second frequency resource. The network entity 105 may perform the communications with the UE 115 during the FD slot and using the first frequency resource and the second frequency resource.

Figure 2:
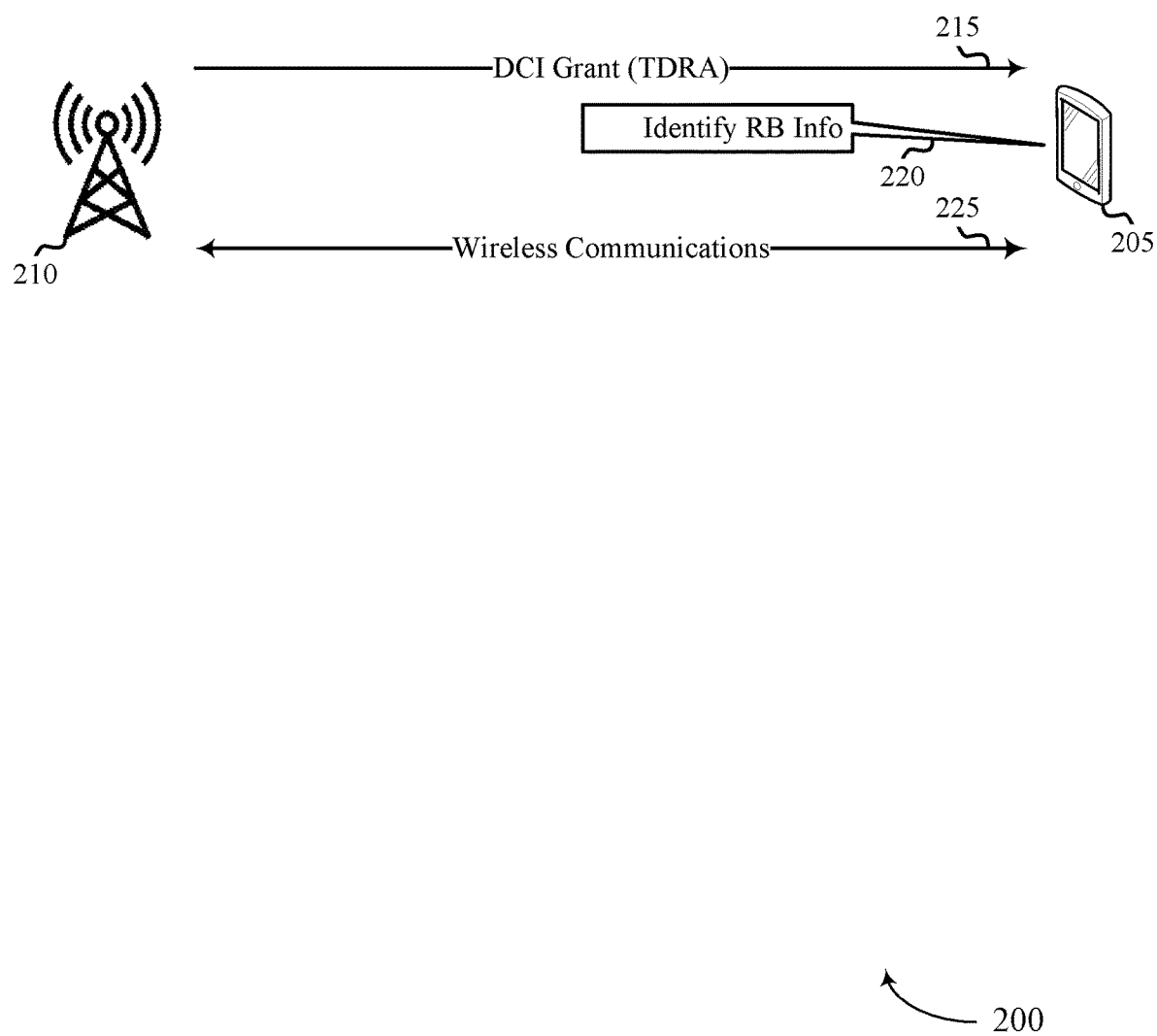
FIG. 2 illustrates an example of a wireless communication system that supports TDRA scheduling multiple transmissions across subbands in accordance with one or more aspects of the present disclosure.

FIG. 2 illustrates an example of a wireless communication system 200 that supports TDRA scheduling multiple transmissions across subbands in accordance with one or more aspects of the present disclosure. Wireless communication system 200 may implement aspects of wireless communication system 100. Wireless communication system 200 may include UE 205 and network entity 210, which may be examples of the corresponding devices described herein.

Wireless communication system 200 may support FD operations, such as using SBFD slots (e.g., "flexible duplex" slots) having one or more uplink subbands, one or more downlink subbands, and optionally one or more guard or gap bands between adjacent uplink and downlink subbands. A SBFD slot enables transmitting and receiving at the same time, but on different frequency resources (e.g., the downlink resources and separated from the uplink resources in the frequency domain). Other examples of FD operations include using an in-band full-duplex (IBFD) slots where the downlink and uplink share the same IBFD time and frequency resources (e.g., fully or at least partially overlapping). Accordingly, communications during an IBFD slot include transmitting and receiving at the same time and using the same frequency resources, at least to some degree or in some examples.

Accordingly, a FD slot structure may also be referred to as a "D+U" slot to signify that both downlink and uplink communications are performed during the FD slot. A FD slot structure is defined as both downlink transmissions and uplink transmissions occurring at the same time and in overlapping bands (e.g., IBFD) or in adjacent bands (e.g., adjacent subbands within a SBFD slot). In a given symbol of a FD slot, a half-duplex (HD) UE can either perform an uplink transmission in the uplink band or receive a downlink transmission in the downlink band. In a given symbol of a FD slot, a FD UE can both perform an uplink transmission in the uplink band (IBFD) or uplink subband (SBFD) and receive a downlink transmission in the downlink band (IBFD) or downlink subband (SBFD).

Frequency resources (e.g., the band or subbands) are indicated to the UE in a FDRA field identifying frequency domain resources at the RB level, with a RB consisting of 12 adjacent frequencies (also referred to as tones or subcarriers) and multiple RBs forming a RB set or a RBG. The FDRA field may utilize a Type 0 or a Type 1 format for identifying or configuring the frequency domain resources for a UE. A Type 0 FRDR indication may also be considered a disjointed RB allocation where a bitmap is used to identify the allocated or configured RBGs. The indicated frequency resource allocation may be a multiple of RBG(s), where the RBG size is based on the BWP size as well as other configurations signaled to the UE (e.g., rbg-Size). In the Type 0 FDRA format each bit corresponds to a RBG such that if the bit is set (e.g., "1") then the corresponding RBG is allocated to the UE. In contrast, a Type 1 FDRA field format is considered a consecutive RB allocation scheme where the FDRA field indicates a starting RB and a number of consecutive RBs which are combined in the resource indicator value (RIV) field. That is, the number of bits representing the RIV indication may be a function of the length of the BWP (e.g., a BWP spanning 5 RBs may use a four-bit RIV indication).

Wireless communication system 200 may operate according to a grant-based protocol where network entity 210 manages resources (e.g., time, frequency, spatial, or code resources) used for wireless communications within the wireless network. For example, network entity 210 may transmit a grant (e.g., DCI grant 215) to UE 205 that identifies the resources, as well as other parameters, to be used for the wireless communications within the network. This supports network entity 210 using a single transmission to send a single grant (e.g., one DCI grant 215) scheduling wireless communications in one slot or scheduling wireless communications in multiple slots.

More particularly, wireless networks may support a multi-physical uplink shared channel (PUSCH)/physical downlink shared channel (PDSCH) (e.g., PxSCH) DCI. The number of the multiple PDSCHs or PUSCHs scheduled by the same DCI may be based on the number of time domain resources allocated to the UE in the corresponding row (i.e., the entry in the RRC configuration message for the table) within the configured TDRA table. That is, the UE may be RRC configured with a table corresponding to TRDA indications, where each TDRA indication corresponds to a row, column, or both, within the configured table. More particularly, the scheduling DCI may indicate or otherwise provides a TDRA field as a row index for one of the multiple rows within the TDRA table. Each row contains one or multiple combinations of {mapping type, scheduling offset K0 or K2, start symbol, number of consecutive symbols} for each PDSCH or PUSCH scheduled by the DCI.

A non-limiting example of one row of a TDRA table may include: column(PDSCH mapping type)/row(Type A); column(K0)/row(0); column(S)/row(2); and column(L)/row(6). Column(K0) (or K2) indicates the slot offset (e.g., a slot index) from the offset between the downlink slot where the scheduling DCI is received and the slot where the PxSCH is scheduled. Column(S) indicates the starting symbol and column(L) indicates the number of consecutive symbols, which together are also known as the SLIV (start and length indicator value). Generally, there is one combination (e.g., row) for legacy feature with DCI scheduling a single PxSCH. Multiple combinations for the feature may be supported that one DCI can schedule multiple PxSCHs. The network generally configures the TDRA table with sufficient combinations (e.g., rows) to provide good scheduling flexibility. A row of the TDRA table can indicate PDSCHs or PUSCHs in consecutive or non-consecutive slots. Many fields are common to all scheduled PUSCH or PDSCH in the DCI (e.g., to minimize the DCI size).

However, wireless communication system 200 may use FD slots (e.g., SBFD slots or IBFD slots) where the frequency resources are divided into distinct subbands or overlapping frequencies. The FD slots support UE 205 performing multiple communications during the FD slots, such as concurrent (e.g., at least to some degree) downlink transmissions, uplink transmissions, or a mixture of both uplink and downlink communications during the FD slots.

In SBFD slots, this may result in two disjointed subband allocations (e.g., two downlink disjointed downlink subbands separated by an uplink subband, or vice versa). The two disjointed subbands may be separated by a relatively large subband going in the other direction (e.g., a relatively large amount of frequency resources in an uplink subband separating two disjointed downlink subbands, or vice versa) in addition to any guard or gap band (e.g., frequency resources between adjacent subbands to mitigate leakage and interference).

Conventional networks provide for a single DCI being used to schedule a single PxSCH (uplink or downlink) communication in one slot. Conventional networks also support a single DCI being used to schedule multiple PxSCH communications across multiple slots. However, such conventional networks do not provide a mechanism for a single grant (e.g., DCI grant 215) to schedule FD communications (e.g., multiple PxSCH communications) during a FD slot.

Accordingly, aspects of the techniques described herein provide various mechanisms supporting a single DCI being used to schedule multiple PxSCH (e.g., communications including first and second communications) across multiple RB sets (e.g., different subbands in the SBFD slot example, different or the same frequency resources in the IBFD example) in a FD slot. For a HD UE, the scheduled PxSCH communication may be either a downlink communication or an uplink communication. For a FD UE, the single DCI may schedule PDSCH/PDSCH, PDSCH/PUSCH or PUSCH/PUSCH communications during the FD slot in different RB set(s) (e.g., in different subbands in the SBFD slot, in different or the same frequency resources in the IBFD slot). This reduces the number of DCIs required to schedule FD communications during FD slot and improves communications between UE 205 and network entity 210.

This may include a single DCI (e.g., DCI grant 215) being used to schedule two downlink communications across two downlink subbands, to schedule one downlink and one uplink communication across downlink and uplink subbands, or to schedule two uplink communications across two uplink subbands during the FD slot (e.g., a SBFD slot). This may include a single DCI (e.g., DCI grant 215) being used to schedule two downlink communications, two uplink communications, or one downlink and one uplink communications on different frequency resources, on partially overlapping frequency resources, or on fully overlapping frequency resources during the FD slot (e.g., an IBFD slot). Accordingly, references to RB set(s) in this context generally include the one or more RB sets scheduled for each communication scheduled during the FD slot, with the different RB sets being configured in separate subbands during SBFD slots or in different or overlapping frequency resources during IBFD slots. Correspondingly, references to a FD slot in this context may include the SBFD slot, the IBFD slot, or any other FD slot structure configured for use in a wireless communication system.

Network entity 210 may transmit or otherwise provide a grant to UE 205 (e.g., DCI grant 215). DCI grant 215 may allocate, identify, or otherwise schedule communications during a FD slot (e.g., a SBFD or an IBFD slot). The communications scheduled during the FD slot may include a first communications (e.g., uplink or downlink communications) and a second communications (uplink or downlink communications). More than two communications may be scheduled by DCI grant 215 in the FD slot as well as communications in other slots. For example, communications may also be scheduled in one or more FD slots, additional FD slots, or both, by DCI grant 215.

At 220, UE 205 may identify or otherwise determine a first frequency resource for the first RB set(s) and a second frequency resource for the second RB set(s) (e.g., UE 205 may identify or otherwise determine the RB information) for the FD slot. Each communication scheduled during the FD slot (e.g., the first communications and the second communications) may be associated with one or more corresponding RB sets (e.g., a first one or more RB sets associated with the first communications and a second one or more RB sets associated with the second communications) during the FD slot. As discussed above, each of the one or more RB sets may include the frequency domain resources scheduled or otherwise allocated for the associated communications. Each RB includes 12 subcarriers or tones in the frequency domain, an RB set may include one or more RBs, and one or more RB sets generally spans the frequency resources allocated to the associated communications. The frequency resources may be allocated or otherwise signaled absolutely (e.g., identifying specific frequencies) or relative (e.g., relative to frequency resources within a subband or within a band). In the example where the FD slot is a SBFD slot, the first and second RB set(s) may be in different subbands of the SBFD slot. In the example where the FD slot is an IBFD slot, the first and second RB set(s) may be in the same (e.g., partially or fully overlapping) frequency resources of the IBFD slot.

Network entity 210 may select, configure, identify, or otherwise determine a TDRA field indicated in DCI grant 215 to signal or otherwise identify the frequency resources for the first and second RB set(s). The TDRA field may be selected or otherwise configured to carry or convey an indication of a first frequency resource for the first RB set(s) and a second frequency resource for the second RB set(s). The TDRA field may be utilized to schedule the first and second communications during a FD slot. As discussed above, each or a combination of row(s) in a TDRA table may indicate a K0 or K2 value (e.g., a slot index) signaling the offset or delay in the time domain (e.g., in slots) between DCI grant 215 (e.g., the slot in which DCI grant 215 is transmitted by network entity 210 and received by UE 205) and the FD slot in which the first and second communications are scheduled. Accordingly, each communication being scheduled by DCI grant 215 may have its own slot index indicating which slot that the communications is scheduled for.

In the HD example, communications schedule by DCI grant 215 having different slot indexes are scheduled in different slots. In the FD example, two or more communications being scheduled by DCI grant 215 having the same or common (e.g., shared) slot index (e.g., K0=0 or 1 or 2 or some other slot offset) may signal that those communications are scheduled during a FD slot (e.g., the same slot corresponding to the same slot index). More particularly, a first slot index (K0 or K2) for the first communication scheduled in the first RB set(s) that is the same (e.g., shared) as a second slot index (K0 or K2) for the second communication scheduled in the second RB set(s) may schedule or otherwise identify that the first and second communications are scheduled during the same slot (e.g., during a FD slot). DCI grant 215 scheduling two (or more) communications in the FD slot may carry or otherwise convey an indication of the first and second frequency resources to be used for the two (or more) communications scheduled during the FD slot.

Accordingly, UE 205 may use the TDRA field indicated in the grant to identify or determine the first frequency resource for the first RB set(s) and the second frequency resource for the second RB set(s). The TDRA indication signals that the slot index associated with each communication is the same (e.g., shared) and, based on this, the frequency resources for the communications may be identified. For example, FDRA field carried or otherwise conveyed in DCI grant 215 may identify the same frequency resources (e.g., the same number of allocated RB(s)) for the first and second RB set(s) (e.g., using a single FDRA indication) or separately identify frequency resources for the first and second RB set(s) (e.g., using the single FDRA indication, but split into different portions corresponding to different communications being scheduled).

Thus, network entity 210 may schedule PxSCH communications in different frequency resources during the FD slot and configures the TDRA field in the DCI grant 215 to carry an indication of the RB set(s) of each frequency resource. That is, the TDRA field may be interpreted to signal that the communications are scheduled in a FD slot and therefore the FDRA field may be interpreted based on the FD slot to identify the first and second RB set(s) in different subbands of the SBFD slot or in different or overlapping frequency resources in the band(s) of an IBFD slot. Accordingly, UE 205 and network entity 210 may perform the wireless communications 225 during the FD slot using the frequency resources identified, at least to some degree, by the TDRA field carried in DCI grant 215 (e.g., alone or in combination with the FDRA field).

Figure 3A:
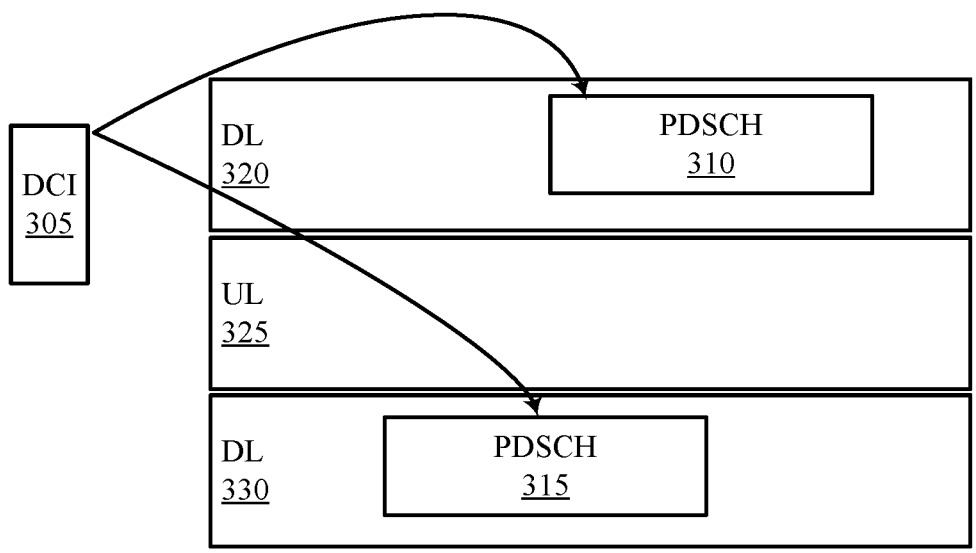
FIGS. 3A and 3B illustrate examples of a slot configuration that supports TDRA scheduling multiple transmissions across subbands in accordance with one or more aspects of the present disclosure.
Figure 3B:
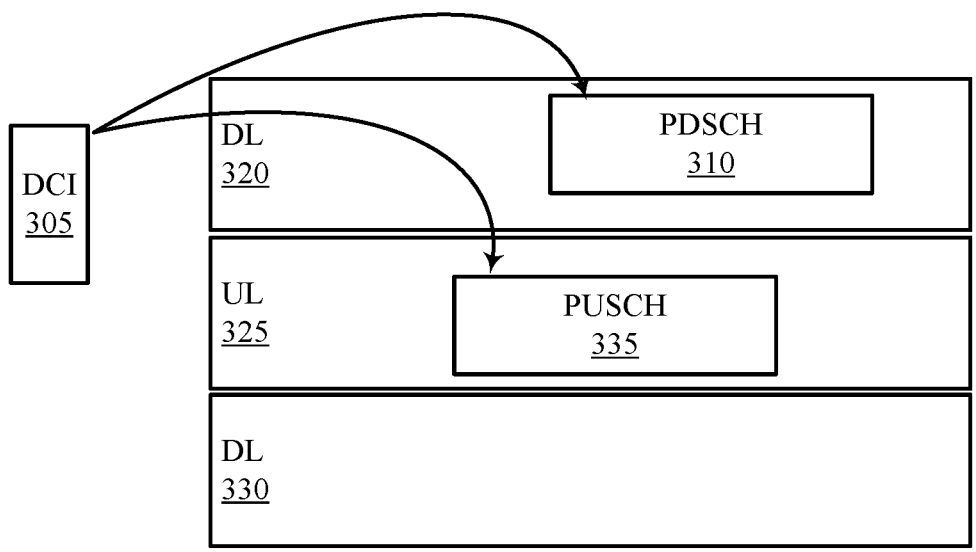

FIGS. 3A and 3B illustrate examples of a slot configuration 300 that supports TDRA scheduling multiple transmissions across subbands in accordance with one or more aspects of the present disclosure. Slot configuration 300 may implement aspects of wireless communication systems 100 or 200. Aspects of slot configuration 300 may be implemented at or implemented by a UE or network entity, which may be examples of the corresponding devices described herein.

Slot configuration 300 illustrates an example of a SBFD slot having a downlink subband 320, an uplink subband 325, and a downlink subband 330. In this example, downlink subband 320 and downlink subband 330 are disjointed subbands, separated by uplink subband 325 as well as any configured guard or gap bands. That is, slot configuration 300 may include a gap or guard band between adjacent uplink and downlink subbands that provides a degree of separation in the frequency domain between the subbands to mitigate leakage and interference.

Slot configuration 300-a of FIG. 3A illustrates an example where DCI grant 305 schedules two downlink transmissions in disjointed, downlink subbands of the SBFD slot. Slot configuration 300-b of FIG. 3B illustrates an example where DCI grant 305 schedules one downlink transmission in a downlink subband and one uplink transmission in an uplink subband of the SBFD slot. Although slot configuration 300 illustrates an example of the techniques described herein applied to the SBFD slot, it is to be understood that such techniques may be applied in an IBFD slot as well. For example, the two downlink communications, or two uplink communications, or at least one each uplink and downlink communications scheduled during an IBFD slot may be scheduled on different, partially overlapping, or fully overlapping frequency resources in the band of the IBFD slot.

Although slot configuration 300 illustrates a non-limiting example of a SBFD slot having two disjointed subbands separated by an uplink subband, it is to be understood that other SBFD slot structures may be used for the techniques described herein (e.g., SBFD slots having two disjointed uplink subbands separated by a downlink subband or an SBFD slot having one uplink subband and one downlink subband).

As discussed above, aspects of the techniques discussed herein provide for a single DCI to schedule multiple communications during a FD slot. For example, a network entity may transmit, provide, or otherwise convey DCI grant 305 to a UE scheduling communications for the UE. The scheduled communications may be for a FD slot (e.g., a SBFD slot, a IBFD slot, or both) or for both FD and HD slots. The UE may receive, obtain, or otherwise identify the DCI grant 305 from the network entity and use the TDRA field indicated in DCI grant 305 to identify or otherwise determine first frequency resources for first RB set(s) and second frequency resources for second RB set(s). That is, DCI grant may schedule multiple (e.g., first and second) communications during the FD slot, with each communication during the FD slot having the same or shared slot index (e.g., K0 or K2 signaling that the two communications are in the same slot). The TDRA field of DCI grant 305 may be interpreted to schedule the first and second communications during the FD slot (e.g., the same or shared slot index). Based on the first and second communications being scheduled during the FD slot, the UE may generally use the FDRA field of DCI grant 305 to identify or otherwise determine the first and second RB set(s) allocated for the communications during the FD slot.

Slot configuration 300 illustrates two non-limiting examples of how the FDRA field indicated in DCI grant 305 may be interpreted in view of DCI grant 305 scheduling the first and second communications during the FD slot. Referring first to slot configuration 300-a of FIG. 3A, this may include the FDRA field indicated in DCI grant 305 signaling or otherwise conveying information used to identify the starting RB (e.g., a first starting RB) of the first RB set(s) (e.g., the starting RB of the RB set(s) allocated to PDSCH 310). The first starting RB (e.g., the starting RB of the first RB set in the first RB set(s)) may then be used to identify or otherwise determine the starting RB (e.g., a second starting RB) of the second RB set(s) (e.g., the starting RB of the RB set(s) allocated to PDSCH 315). That is, when two or more PxSCH (e.g., PDSCH 310 and PDSCH 315) are scheduled with the same slot index and in different subbands (e.g., in different RB set(s), based on the DCI format) during a FD slot, the frequency resources may be configured such that each PxSCH may have the same number of allocated RB(s) in each subband or band. Accordingly, the starting RB indicated in the FDRA field of DCI grant 305 may be interpreted such that the first RB in the first RB set of the RB set(s) indicated for the first communications is the starting RB within the first subband or band that the first communication is being scheduled. The starting RB of the first RB set in the second RB set(s) may be interpreted as the same starting RB, but within the second subband or band that the second communications is being scheduled. Thus, both PxSCH scheduled during the FD slot may have or use the same FDRA field in this example, where the FDRA field is interpreted with respect to the subband or band rather than the bandwidth part (BWP) configured for the UE.

Referring next to slot configuration 300-b of FIG. 3B, this may include the FDRA field indicated in DCI grant 305 signaling or otherwise conveying information used to identify the starting RB (e.g., a first starting RB) of the first RB set(s) (e.g., the starting RB of the RB set(s) allocated to PDSCH 310). However, in this example the FDRA field may be split into two (or more) portions or bits where each portion or bitfield indicates the FDRA for each subband or band. That is, the FDRA field indicated in DCI grant 305 may be configured to carry or otherwise convey a first portion used to identify the starting RB of the first RB in the first RB set(s) (e.g., a first starting RB) for the first communications (e.g., PDSCH 310) in the first subband or first band (e.g., in downlink subband 320 in this example) and a second portion used to identify the starting RB of the first RB of the second RB set(s) (e.g., a second starting RB) for the second communications in the second subband or second band (e.g., in uplink subband 325 in this example). Accordingly, in this example the UE may use the second portion of the FDRA field to identify or otherwise determine the second starting RB of the first RB set in the second RB set(s) (e.g., the second starting RB) for the second communications (e.g., PUSCH 335 in this example) in the second subband or subband (e.g., in uplink subband 325 in this example). It is to be understood that the FDRA field may be split evenly (e.g., allocating the same number of bits to each of the first and second RB set(s)) or non-evenly (e.g., using different bits for the first and second RB set(s)).

Accordingly, the UE and network entity may perform wireless communications (e.g., the first and second communications) in the first and second subbands or bands, respectively, according to the first and second frequency resources (e.g., the first and second RB set(s), respectively) during the FD slot according to DCI grant 305.

FIG. 4 illustrates an example of a slot configuration 400 that supports TDRA scheduling multiple transmissions across subbands in accordance with one or more aspects of the present disclosure. Slot configuration 400 may implement aspects of wireless communication systems 100 or 200 or aspects of slot configuration 300. Aspects of slot configuration 400 may be implemented at or implemented by a UE or network entity, which may be examples of the corresponding devices described herein.

Figure 4A:
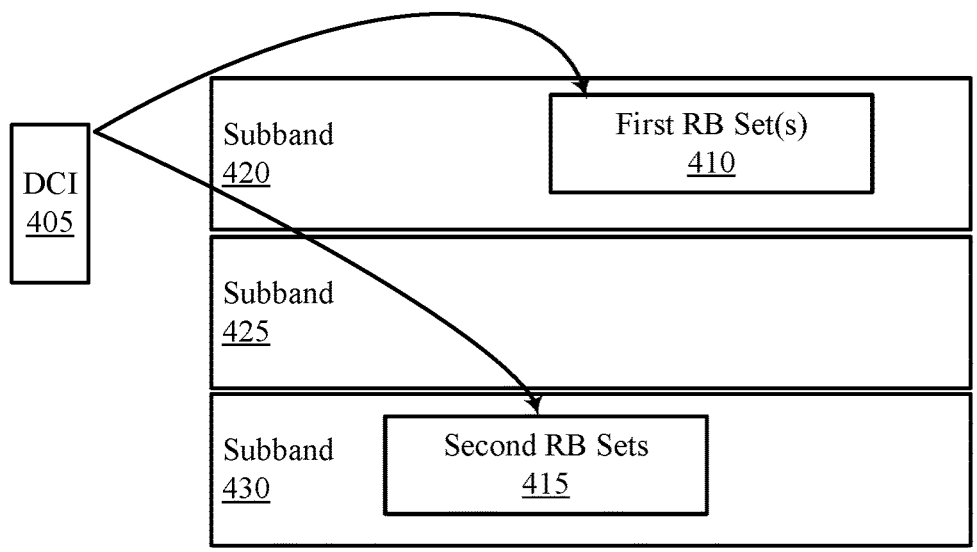
FIGS. 4A and 4B illustrate examples of a slot configuration that supports TDRA scheduling multiple transmissions across subbands in accordance with one or more aspects of the present disclosure.
Figure 4B:
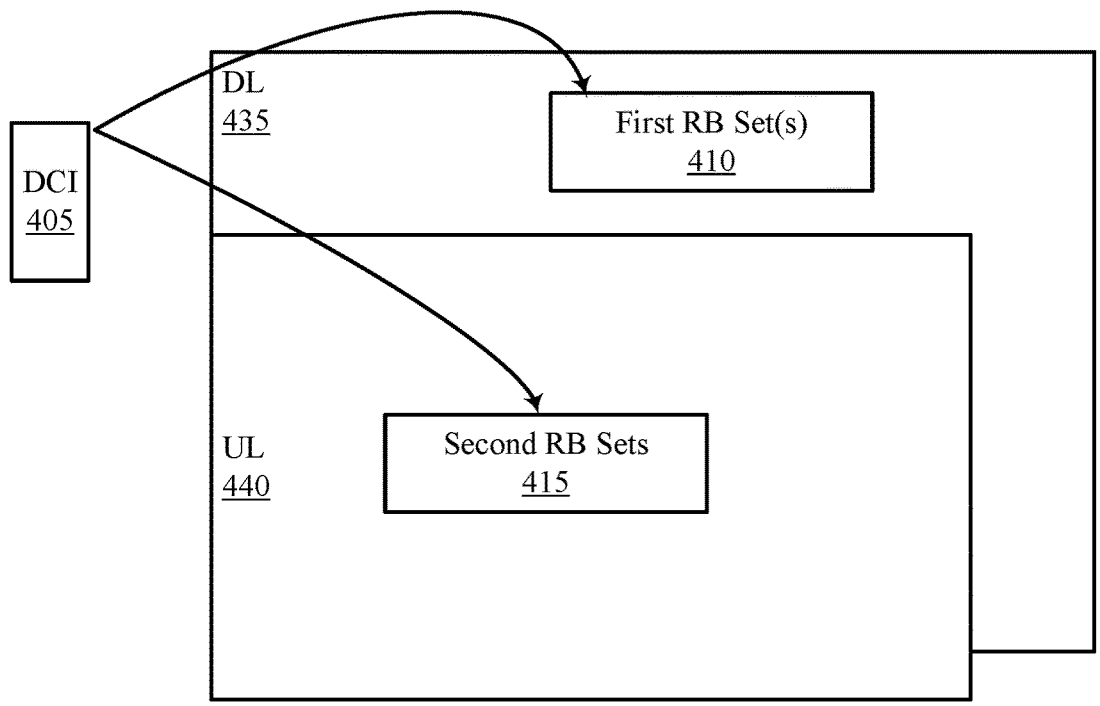

Slot configuration 400 illustrates an example of a FD slot, with slot configuration 400-*a* of FIG. 4A showing a SBFD slot and slot configuration 400-*b* of FIG. 4B showing an IBFD slot. The SBFD slot may include a subband 420, a subband 425, and a subband 430. Each of subband 420, subband 425, or subband 430 may be uplink subband(s) or downlink subband(s). The SBFD slot may also include one or more gap or guard bands separating adjacent subbands. The IBFD slot may include a downlink band 435 and an uplink band 440, which may include partially or fully overlapping time, frequency, or both, resources, at least to some degree.

Slot configuration 400-*a* of FIG. 4A illustrates an example where DCI grant 405 schedules two wireless communications in disjointed, subbands of the SBFD slot. Slot configuration 400-*b* of FIG. 4B illustrates an example where DCI grant 405 schedules one downlink transmission in downlink band 435 and one uplink transmission in uplink band 440 of the IBFD slot.

As discussed above, aspects of the techniques discussed herein provide for a single DCI to schedule multiple communications during a FD slot. For example, a network entity may transmit, provide, or otherwise convey DCI grant 405 to a UE scheduling communications for the UE. The scheduled communications may be for a FD slot (e.g., a SBFD slot, a IBFD slot, or both) or for both FD and HD slots. The UE may receive, obtain, or otherwise identify the DCI grant 405 from the network entity and use the TDRA field indicated in DCI grant 405 to identify or otherwise determine first frequency resources for first RB set(s) 410 and second frequency resources for second RB set(s) 415. That is, DCI grant 405 may schedule multiple (e.g., first and second) communications during the FD slot, with each communication during the FD slot having the same or shared slot index (e.g., K0 or K2 signaling that the two communications are in the same slot). The TDRA field of DCI grant 405 may be interpreted to schedule the first and second communications during the FD slot (e.g., the same or shared slot index). Based on the first and second communications being scheduled during the FD slot, the UE may generally use the FDRA field of DCI grant 405 to identify or otherwise determine the first and second RB set(s) allocated for the communications during the FD slot.

More particularly, DCI grant 405 may carry or otherwise convey various parameters, indexes, and so forth scheduling each communication during the FD slot. Such parameters and such may be configured to convey an indication that the wireless communications being scheduled are both for the FD slot as well as to convey additional details. One example may include the using the redundancy version (RV) and codeword (CW) scheduled by DCI grant 405 being used to signal repetitions within the communications during the FD slot. For example, each communication scheduled during the FD slot may have an associated RV and CW (e.g., a first RV and first CW for the first communications using the first RB set(s) 410 and a second RV and second CW for the second communications using the second RB set(s) 415). Configuring the RV and CW to be the same for the two communications scheduled during the FD slot may indicate that the second communications is a repetition of the first communications. Configuring the RV and CW to be different for the two communications scheduled during the FD slot may indicate that the first and second communications are different communications (e.g., different CWs). Although both allocations (e.g., scheduled wireless communications) are configured with the same slot (e.g., same slot index, signaling the FD slot), each may have different symbol indexes such that each communication in the FD slot begins at different symbols.

Slot configuration 400 illustrates two non-limiting examples of how the FDRA field indicated in DCI grant 405 may be interpreted in view of DCI grant 405 scheduling the first and second communications during the FD slot. Referring first to slot configuration 400-*a* of FIG. 4A, this may include the FDRA field indicated in DCI grant 405 signaling or otherwise conveying information used to identify the starting RB (e.g., a first starting RB) of the first RB set(s) 410 (e.g., the starting RB of the RB set(s) allocated the first communications). The first starting RB (e.g., the starting RB of the first RB set in the first RB set(s) 410) may then be used to identify or otherwise determine the starting RB (e.g., a second starting RB) of the second RB set(s) 415 (e.g., the starting RB of the RB set(s) allocated to the second communications). That is, when two or more communications are scheduled with the same slot index and in different subbands (e.g., in different RB set(s), based on the DCI format) or in different, but overlapping bands (e.g., based on the DCI format) during a FD slot, the frequency resources may be configured such that each communication may have the same number of allocated RB(s) in each subband or band. Accordingly, the starting RB indicated in the FDRA field of DCI grant 405 may be interpreted such that the first RB in the first RB set of the RB set(s) indicated for the first communications is the starting RB within the first subband or band that the first communication is being scheduled. The starting RB of the first RB set in the second RB set(s) 415 may be interpreted as the same starting RB, but within the second subband or band that the second communications is being scheduled. Thus, both communications scheduled during the FD slot may have or use the same TDRA field in this example, where the FDRA field is interpreted with respect to the subband or band rather than the BWP configured for the UE.

Referring next to slot configuration 400-*b* of FIG. 4B, this may include the FDRA field indicated in DCI grant 405 signaling or otherwise conveying information used to identify the starting RB (e.g., a first starting RB) of the first RB set(s) (e.g., the starting RB of the RB set(s) allocated to the first communications). However, in this example the FDRA field may be split into two (or more) portions or bits where each portion or bitfield indicates the FDRA for each subband or band. That is, the FDRA field indicated in DCI grant 405 may be configured to carry or otherwise convey a first portion used to identify the starting RB of the first RB in the first RB set(s) 410 (e.g., a first starting RB) for the first communications in the first subband (e.g., in subband 420) or first band (e.g., in downlink band 435) and a second portion used to identify the starting RB of the first RB of the second RB set(s) 415 (e.g., a second starting RB) for the second communications in the second subband (e.g., in subband 430) or second band (e.g., in uplink band 440). Accordingly, in this example the UE may use the second portion of the FDRA field to identify or otherwise determine the second starting RB of the first RB set in the second RB set(s) 415 for the second communications in the second subband or subband. It is to be understood that the FDRA field may be split evenly (e.g., allocating the same number of bits to each of the first and second RB set(s)) or non-evenly (e.g., using different bits for the first and second RB set(s)).

Accordingly, the UE and network entity may perform wireless communications (e.g., the first and second communications) in the first and second subbands or bands, respectively, according to the first and second frequency resources (e.g., the first and second RB set(s), respectively) during the FD slot according to DCI grant 405.

Figure 5:
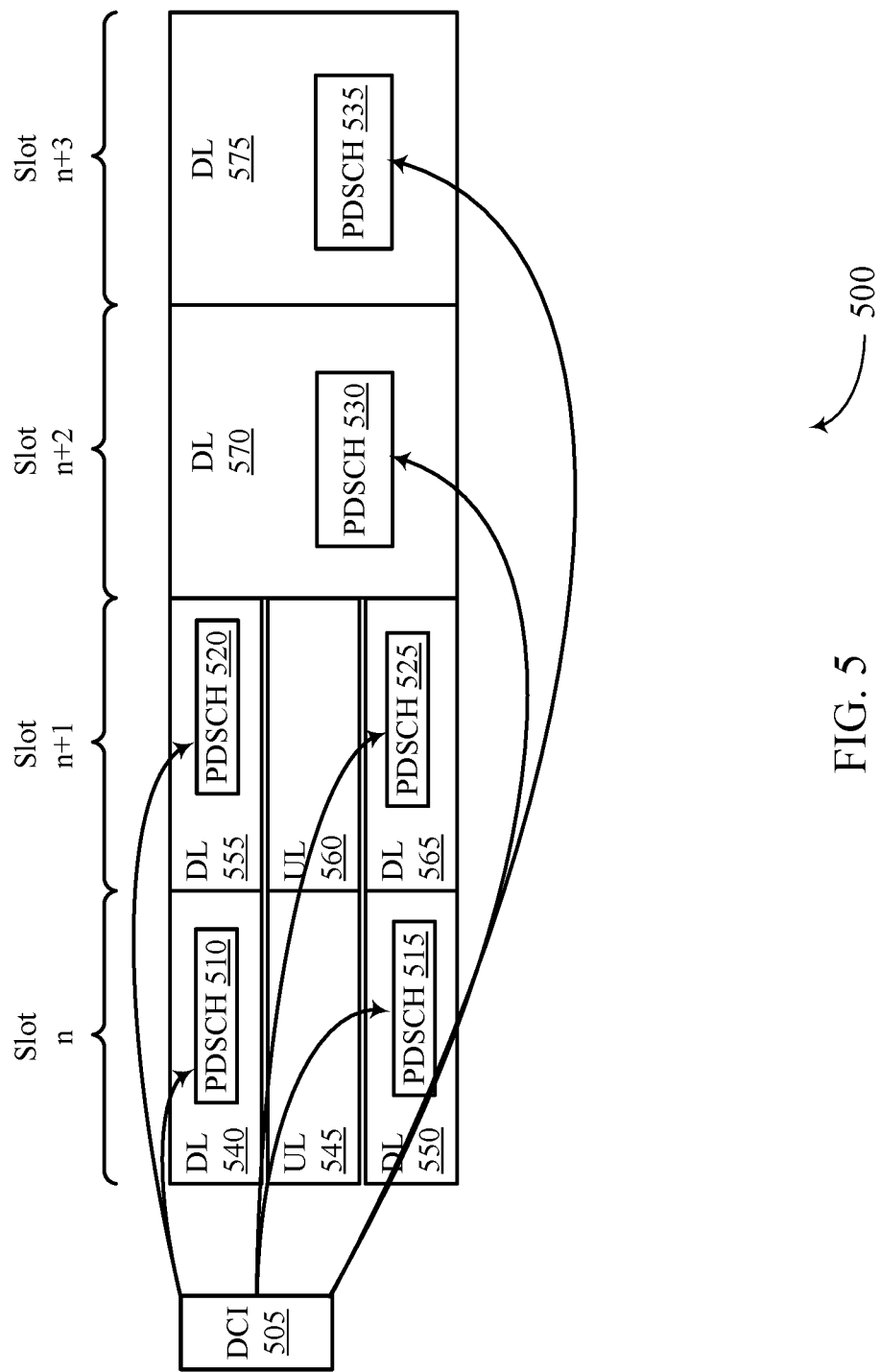
FIG. 5 illustrates an example of a slot configuration that supports TDRA scheduling multiple transmissions across subbands in accordance with one or more aspects of the present disclosure.

FIG. 5 illustrates an example of a slot configuration 500 that supports TDRA scheduling multiple transmissions across subbands in accordance with one or more aspects of the present disclosure. Slot configuration 500 may implement aspects of wireless communication systems 100 or 200 or aspects of slot configurations 300 or 400. Aspects of slot configuration 500 may be implemented at or implemented by a UE or network entity, which may be examples of the corresponding devices described herein.

Slot configuration 500 illustrates an example of a mixture of FD slots and HD slots being scheduled by DCI grant 505, with two FD slots (slot n and slot n+1) and two HD slots (slot n+2 and slot n+3) shown by way of example only. The two FD slots shown in slot configuration 500 include two SBFD slots, although the described techniques may be applicable in IBFD slots. The SBFD slot during slot n may include a downlink subband 540, an uplink subband 545, and a downlink subband 550. The SBFD slot during slot n+1 may include a downlink subband 555, an uplink subband 560, and a downlink subband 565. The HD slot during slot n+2 may be a downlink slot 570. The HD slot during slot n+3 may be a downlink slot 575. The SBFD slot(s) may also include one or more gap or guard bands separating adjacent subbands.

Slot configuration 500 illustrates an example where DCI grant 505 schedules two wireless communications in disjointed, subbands during both of the SBFD slots as well as scheduling wireless communications in two subsequent HD slots.

As discussed above, aspects of the techniques discussed herein provide for a single DCI to schedule multiple communications during a FD slot. For example, a network entity may transmit, provide, or otherwise convey DCI grant 505 to a UE scheduling communications for the UE. The scheduled communications may be for a FD slot (e.g., during two SBFD slots, in this example) and for HD slots (during two HD slots, in this example). The UE may receive, obtain, or otherwise identify the DCI grant 505 from the network entity and use the TDRA field indicated in DCI grant 505 to identify or otherwise determine first frequency resources for first RB set(s) (e.g., corresponding to PDSCH 510) and second frequency resources for second RB set(s) (e.g., corresponding to PDSCH 515). In this example, the DCI grant 505 may schedule additional communications (e.g., third communications) for the UE. For example, the TDRA field carried or otherwise conveyed in the DCI grant 505 may point to (e.g., indicate an index or number corresponding to a row in a TDRA table) M PxSCH being scheduled, with M being a positive integer value corresponding two or more wireless communications. Some of the communications scheduled by the DCI grant 505 may have the same (e.g., shared) slot index, signaling those communications are scheduled during FD slot(s). Others of the communications scheduled by the DCI grant 505 may have different slot indexes, signaling those communications are scheduled during HD slots.

In the non-limiting example illustrated in FIG. 5, this may include the DCI grant 505 scheduling PDSCH 510 in downlink subband 540 and PDSCH 515 in downlink subband 550 during slot n, scheduling PDSCH 520 in downlink subband 555 and PDSCH 525 in downlink subband 565 during slot n+1, scheduling PDSCH 530 in downlink slot 570 (e.g., during slot n+2), and scheduling PDSCH 535 in downlink slot 575 (e.g., during slot n+3).

The UE may use the TDRA field indicated in the DCI grant 505 to identify or otherwise determine that the FD and HD communications are being scheduled. The UE may then interpret the FDRA field indicated in DCI grant 505 based on the communications being scheduled during FD slots or during HD slots. For example, the FDRA field may be interpreted with respect to downlink subband 540 for PDSCH 510 and with respect to downlink subband 550 for PDSCH 515, similarly for slot n+1, with respect to the downlink band during slot n+2, and similarly for slot n+3. For example, the FDRA field may be interpreted relative to the subband or band and used to identify or otherwise determine the starting RBs of the first RB in each RB set allocated for each scheduled communication. In some examples, the UE may be configured with a BWP for the HD slots. In this situation, the FDRA field may be interpreted with respect to the BWP during the HD slots.

Accordingly, the UE and network entity may perform wireless communications (e.g., the first and second communications) in the first and second subbands or bands, respectively, according to the first and second frequency resources (e.g., the first and second RB set(s), respectively) during the FD and HD slots according to DCI grant 505.

Figure 6:
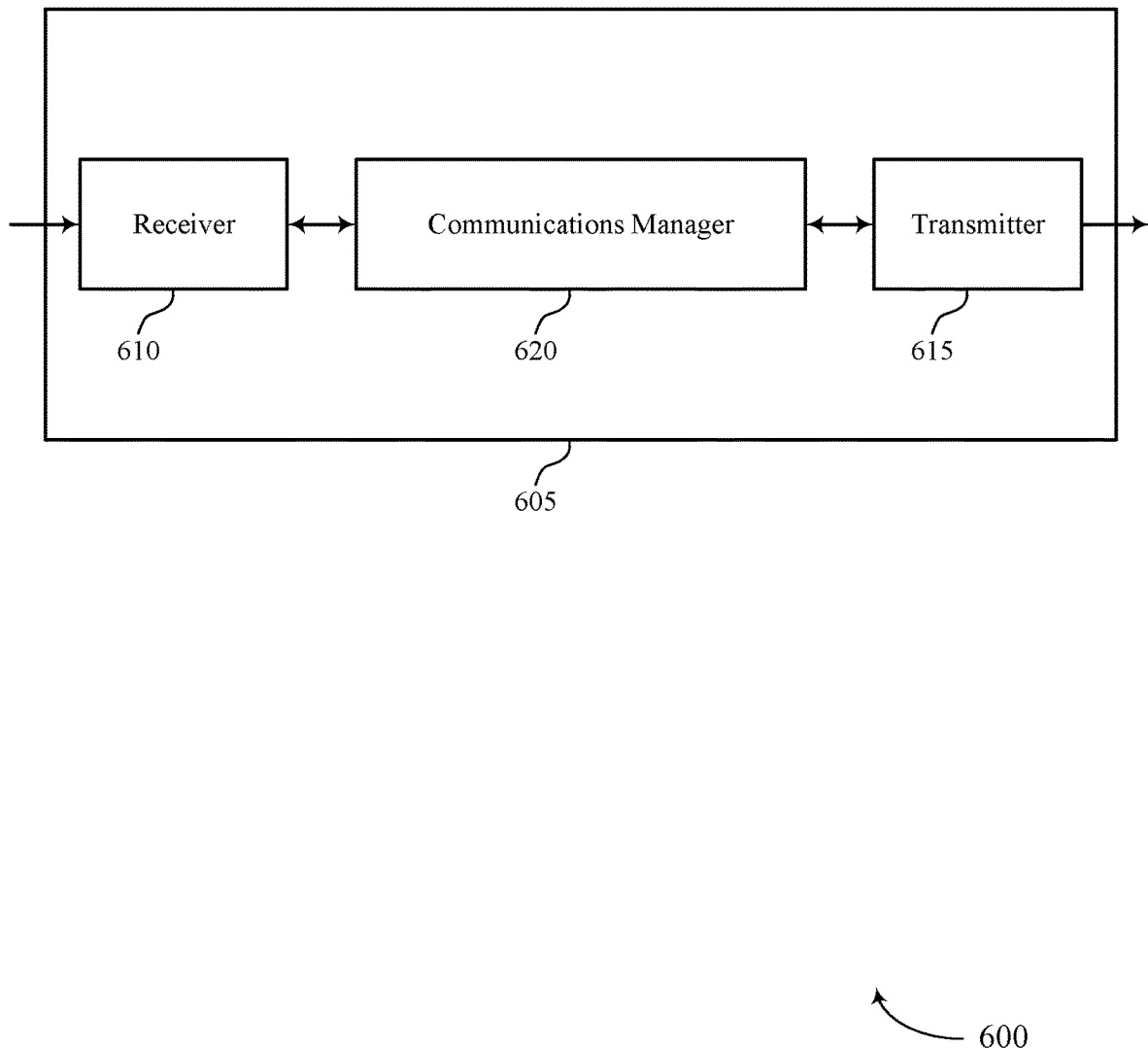
FIGS. 6 and 7 show block diagrams of devices that support TDRA scheduling multiple transmissions across subbands in accordance with one or more aspects of the present disclosure.

FIG. 6 shows a block diagram 600 of a device 605 that supports TDRA scheduling multiple transmissions across subbands in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to TDRA scheduling multiple transmissions across subbands). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to TDRA scheduling multiple transmissions across subbands). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of TDRA scheduling multiple transmissions across subbands as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving a grant scheduling communications during a FD slot, the communications including a first communications using a first one or more RB sets and a second communications using a second one or more RB sets. The communications manager 620 may be configured as or otherwise support a means for identifying, based on a TDRA field indicated in the grant, a first frequency resource for the first one or more RB sets and a second frequency resource for the second one or more RB sets. The communications manager 620 may be configured as or otherwise support a means for performing the communications during the FD slot and using the first frequency resource and the second frequency resource.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for improved scheduling of wireless communications in FD slots using the TDRA field to carry or otherwise convey an indication that the communications are scheduled in a FD slot, and accordingly the FDRA field may be interpreted relative to the subband or band in the FD slot(s).

Figure 7:
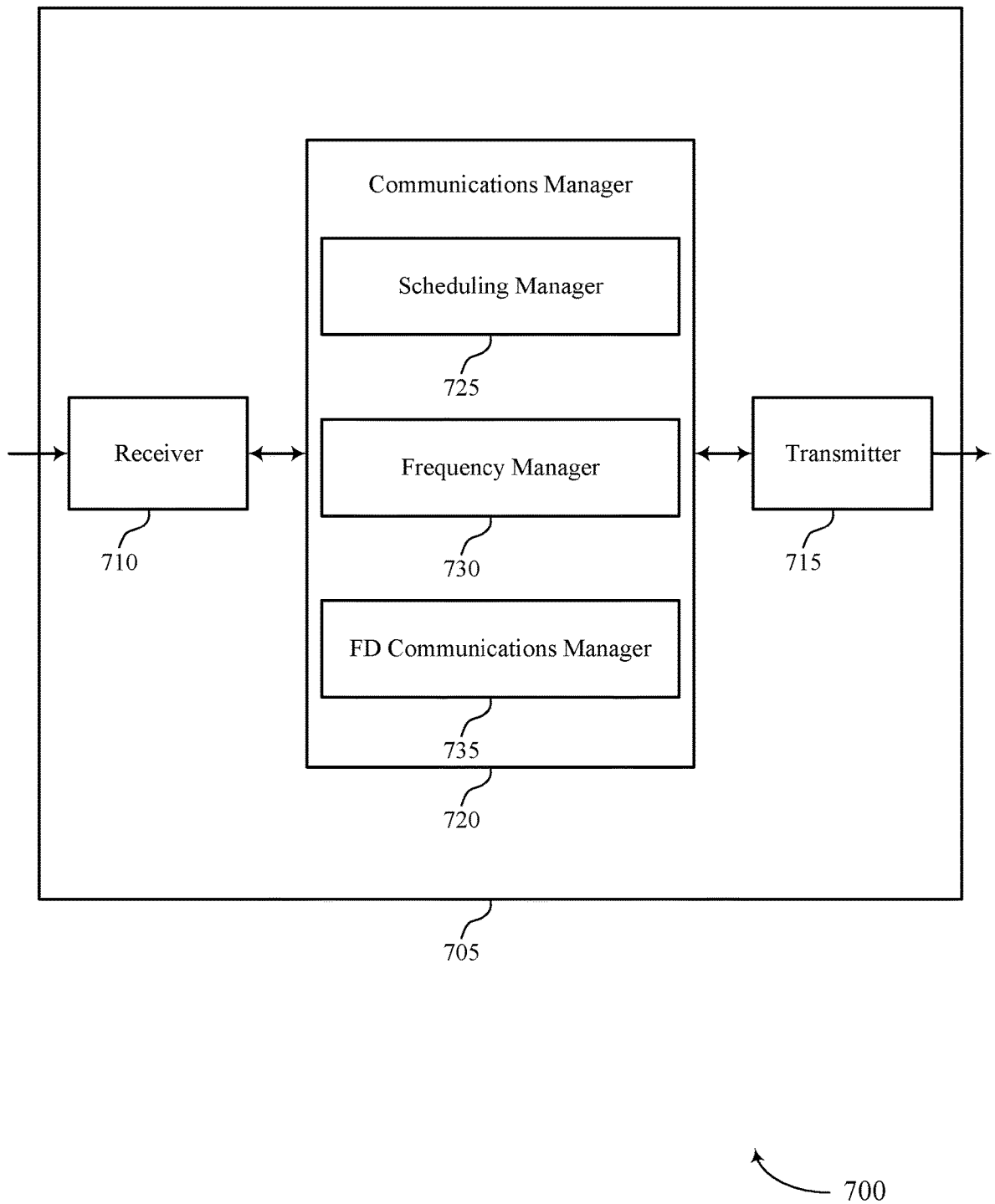

FIG. 7 shows a block diagram 700 of a device 705 that supports TDRA scheduling multiple transmissions across subbands in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to TDRA scheduling multiple transmissions across subbands). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to TDRA scheduling multiple transmissions across subbands). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of TDRA scheduling multiple transmissions across subbands as described herein. For example, the communications manager 720 may include a scheduling manager 725, a frequency manager 730, an FD communications manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The scheduling manager 725 may be configured as or otherwise support a means for receiving a grant scheduling communications during a FD slot, the communications including a first communications using a first one or more RB sets and a second communications using a second one or more RB sets. The frequency manager 730 may be configured as or otherwise support a means for identifying, based on a TDRA field indicated in the grant, a first frequency resource for the first one or more RB sets and a second frequency resource for the second one or more RB sets. The FD communications manager 735 may be configured as or otherwise support a means for performing the communications during the FD slot and using the first frequency resource and the second frequency resource.

Figure 8:
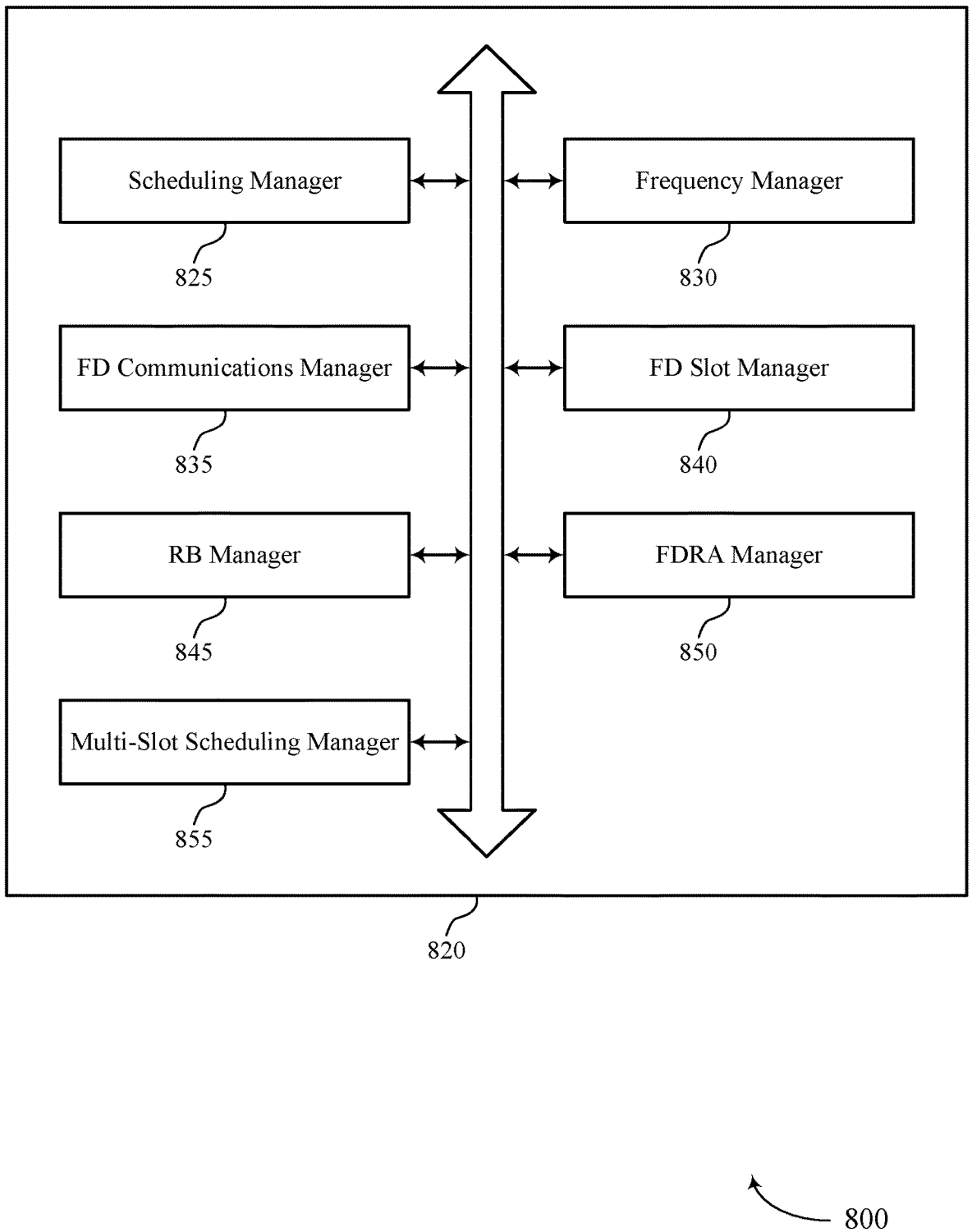
FIG. 8 shows a block diagram of a communications manager that supports TDRA scheduling multiple transmissions across subbands in accordance with one or more aspects of the present disclosure.

FIG. 8 shows a block diagram 800 of a communications manager 820 that supports TDRA scheduling multiple transmissions across subbands in accordance with one or more aspects of the present disclosure. The communications manager 820 may be an example of aspects of a communications manager 620, a communications manager 720, or both, as described herein. The communications manager 820, or various components thereof, may be an example of means for performing various aspects of TDRA scheduling multiple transmissions across subbands as described herein. For example, the communications manager 820 may include a scheduling manager 825, a frequency manager 830, an FD communications manager 835, an FD slot manager 840, an RB manager 845, an FDRA manager 850, a multi-slot scheduling manager 855, or any combination thereof. Each of these components may communicate, directly or indirectly, with one another (e.g., via one or more buses).

The communications manager 820 may support wireless communications at a UE in accordance with examples as disclosed herein. The scheduling manager 825 may be configured as or otherwise support a means for receiving a grant scheduling communications during a FD slot, the communications including a first communications using a first one or more RB sets and a second communications using a second one or more RB sets. The frequency manager 830 may be configured as or otherwise support a means for identifying, based on a TDRA field indicated in the grant, a first frequency resource for the first one or more RB sets and a second frequency resource for the second one or more RB sets. The FD communications manager 835 may be configured as or otherwise support a means for performing the communications during the FD slot and using the first frequency resource and the second frequency resource.

In some examples, the FD slot manager 840 may be configured as or otherwise support a means for identifying, based on the TDRA field, a first slot index for the first communications and a second slot index for the second communications. In some examples, the FD slot manager 840 may be configured as or otherwise support a means for determining that the grant schedules communications during the FD slot based on the first slot index and the second slot index indicating a shared slot index.

In some examples, the FD slot manager 840 may be configured as or otherwise support a means for identifying, based on the grant, a first redundancy version and a first codeword for the first communications and a second redundancy version and a second codeword for the second communications. In some examples, the FD slot manager 840 may be configured as or otherwise support a means for determining that the second communications is a repetition of the first communications based on the first redundancy version and the second redundancy version being a same redundancy version and the first codeword and the second codeword being a same codeword.

In some examples, the FD slot manager 840 may be configured as or otherwise support a means for identifying, based on the grant, a first redundancy version and a first codeword for the first communications and a second redundancy version and a second codeword for the second communications. In some examples, the FD slot manager 840 may be configured as or otherwise support a means for determining that the first communications and the second communications are different communications based on the first redundancy version and the second redundancy version being different redundancy versions and the first codeword and the second codeword being different codewords.

In some examples, the FD slot manager 840 may be configured as or otherwise support a means for identifying, based on the TDRA field, a first starting symbol during the FD slot for the first communications and a second starting symbol during the FD slot for the second communications, where the first starting symbol and the second starting symbol include a same starting symbol or a different starting symbol.

In some examples, the RB manager 845 may be configured as or otherwise support a means for identifying, based on a FDRA field indicated in the grant, a first starting RB of the first one or more RB sets within the first frequency resource to use for the first communications. In some examples, the RB manager 845 may be configured as or otherwise support a means for identifying, based on the first starting RB, a second starting RB of the second one or more RB sets within the second frequency resource to use for the second communications.

In some examples, the FDRA manager 850 may be configured as or otherwise support a means for identifying, based on a first portion of a FDRA field indicated in the grant, a first starting RB of the first one or more RB sets within the first frequency resource to use for the first communications. In some examples, the FDRA manager 850 may be configured as or otherwise support a means for identifying, based on a second portion of FDRA field, a second starting RB of the second one or more RB sets within the second frequency resource to use for the second communications.

In some examples, the multi-slot scheduling manager 855 may be configured as or otherwise support a means for identifying, based on the grant, the first communications and the second communications scheduled during the FD slot based on a shared slot index associated with the first communications and the second communications and a third communications scheduled during a HD slot based on a slot index that is different from the shared slot index. In some examples, the first frequency resource and the second frequency resource include different subbands during a SBFD or include overlapping frequency resources during an IBFD slot.

Figure 9:
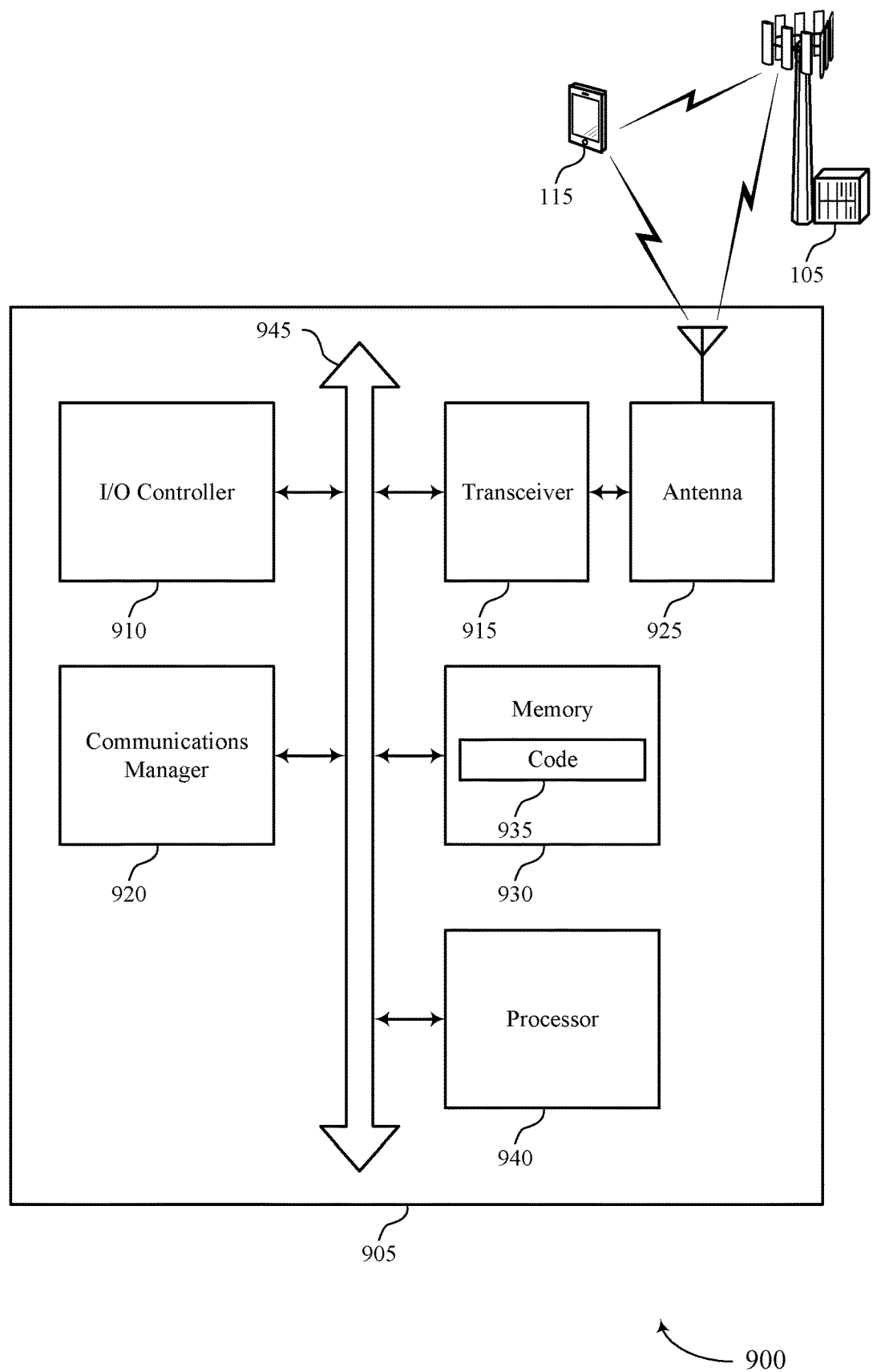
FIG. 9 shows a diagram of a system including a device that supports TDRA scheduling multiple transmissions across subbands in accordance with one or more aspects of the present disclosure.

FIG. 9 shows a diagram of a system 900 including a device 905 that supports TDRA scheduling multiple transmissions across subbands in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting TDRA scheduling multiple transmissions across subbands). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a grant scheduling communications during a FD slot, the communications including a first communications using a first one or more RB sets and a second communications using a second one or more RB sets. The communications manager 920 may be configured as or otherwise support a means for identifying, based on a TDRA field indicated in the grant, a first frequency resource for the first one or more RB sets and a second frequency resource for the second one or more RB sets. The communications manager 920 may be configured as or otherwise support a means for performing the communications during the FD slot and using the first frequency resource and the second frequency resource.

By including or configuring the communications manager 920 in accordance with examples as described herein, the device 905 may support techniques for improved scheduling of wireless communications in FD slots using the TDRA field to carry or otherwise convey an indication that the communications are scheduled in a FD slot, and accordingly the FDRA field may be interpreted relative to the subband or band in the FD slot(s).

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of TDRA scheduling multiple transmissions across subbands as described herein, or the processor 940 and the memory 930 may be otherwise configured to perform or support such operations.

Figure 10:
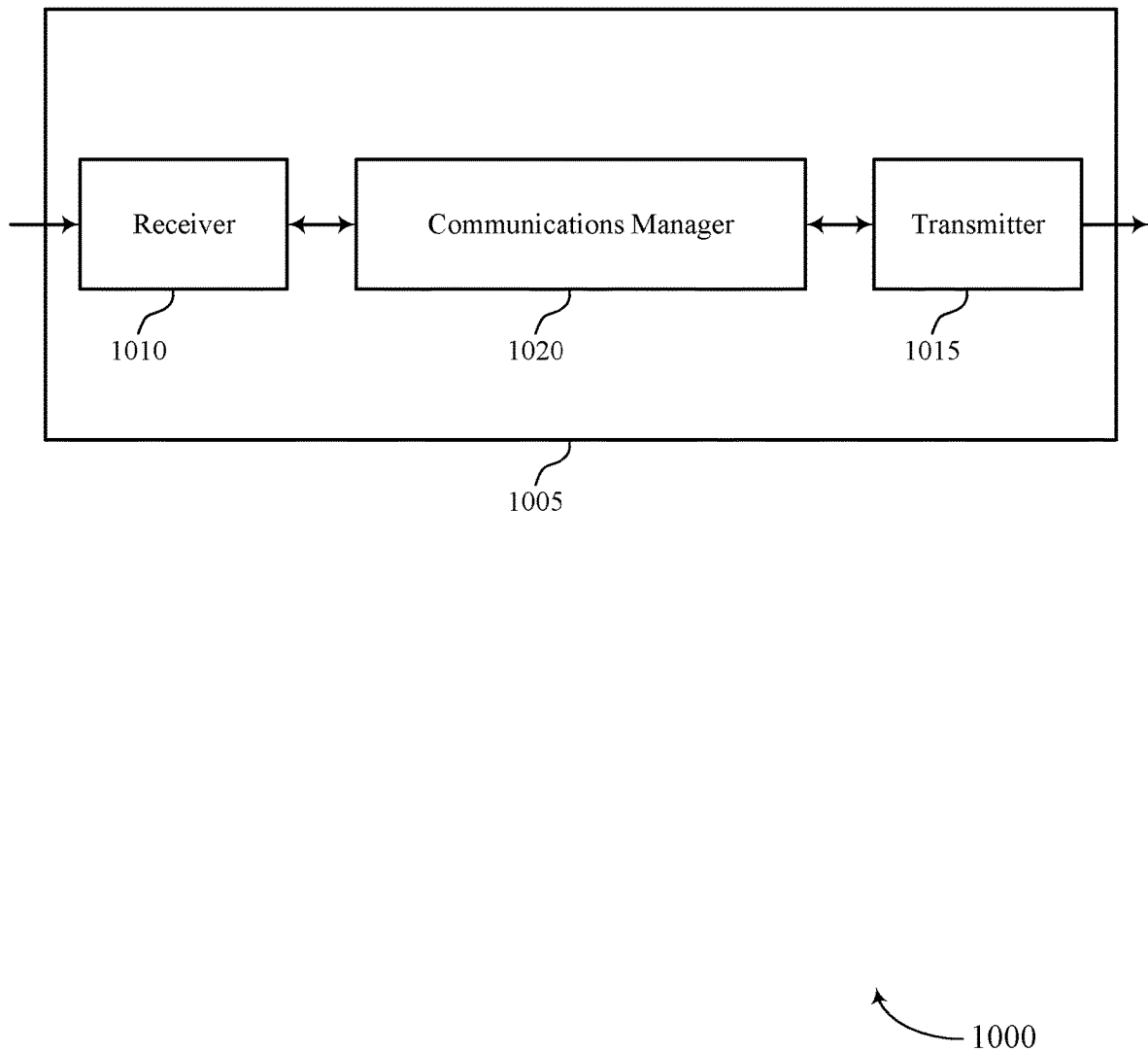
FIGS. 10 and 11 show block diagrams of devices that support TDRA scheduling multiple transmissions across subbands in accordance with one or more aspects of the present disclosure.

FIG. 10 shows a block diagram 1000 of a device 1005 that supports TDRA scheduling multiple transmissions across subbands in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of TDRA scheduling multiple transmissions across subbands as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for identifying, for a UE, a first frequency resource for a first one or more RB sets associated with a first communications during a FD slot and a second frequency resource for a second one or more RB sets associated with a second communications during the FD slot. The communications manager 1020 may be configured as or otherwise support a means for transmitting a grant to the UE scheduling the first communications and the second communications during the FD slot, the grant including a TDRA field identifying the first frequency resource and the second frequency resource. The communications manager 1020 may be configured as or otherwise support a means for performing the communications with the UE during the FD slot and using the first frequency resource and the second frequency resource.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for improved scheduling of wireless communications in FD slots using the TDRA field to carry or otherwise convey an indication that the communications are scheduled in a FD slot, and accordingly the FDRA field may be interpreted relative to the subband or band in the FD slot(s).

Figure 11:
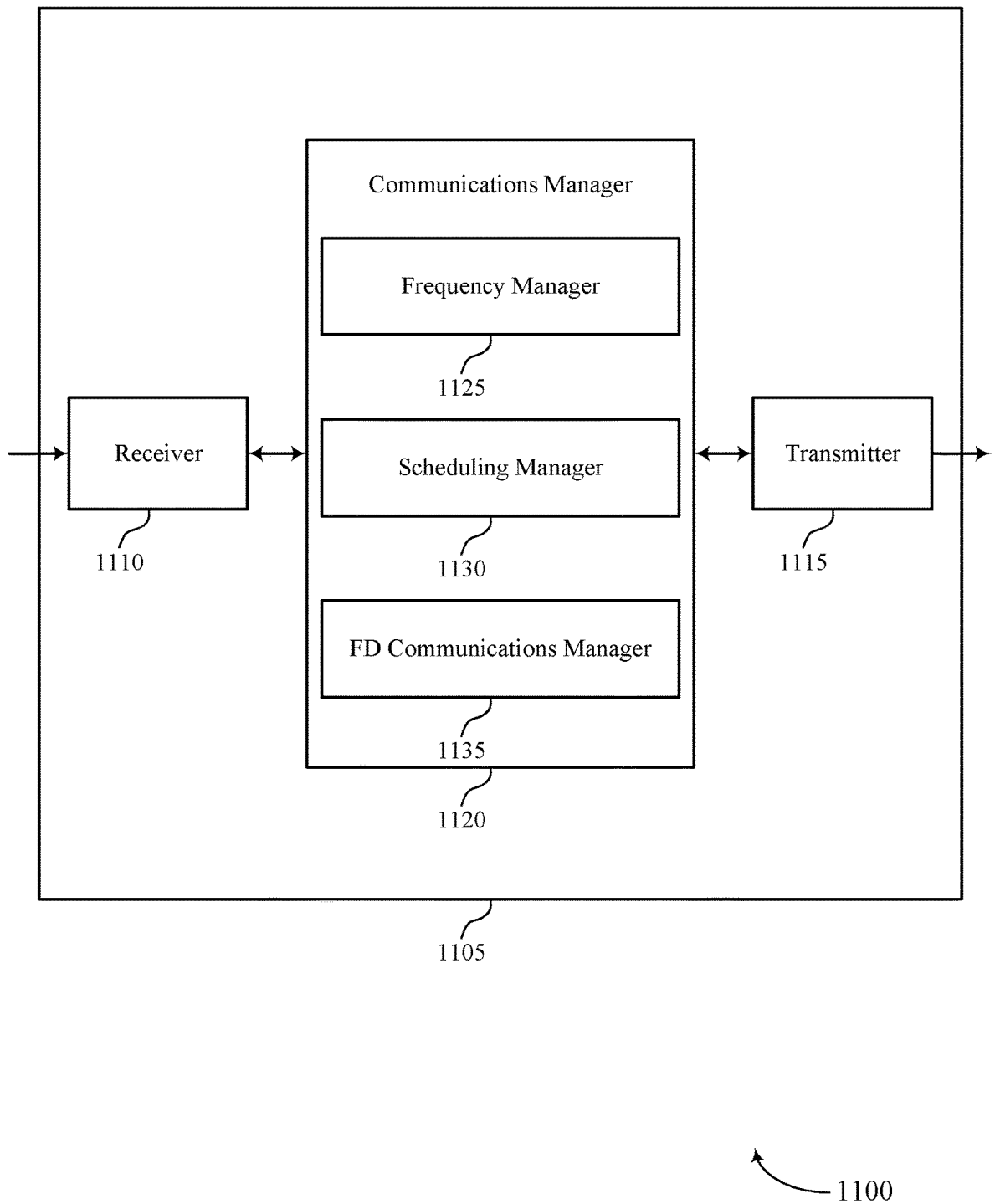

FIG. 11 shows a block diagram 1100 of a device 1105 that supports TDRA scheduling multiple transmissions across subbands in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of TDRA scheduling multiple transmissions across subbands as described herein. For example, the communications manager 1120 may include a frequency manager 1125, a scheduling manager 1130, an FD communications manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The frequency manager 1125 may be configured as or otherwise support a means for identifying, for a UE, a first frequency resource for a first one or more RB sets associated with a first communications during a FD slot and a second frequency resource for a second one or more RB sets associated with a second communications during the FD slot. The scheduling manager 1130 may be configured as or otherwise support a means for transmitting a grant to the UE scheduling the first communications and the second communications during the FD slot, the grant including a TDRA field identifying the first frequency resource and the second frequency resource. The FD communications manager 1135 may be configured as or otherwise support a means for performing the communications with the UE during the FD slot and using the first frequency resource and the second frequency resource.

Figure 12:
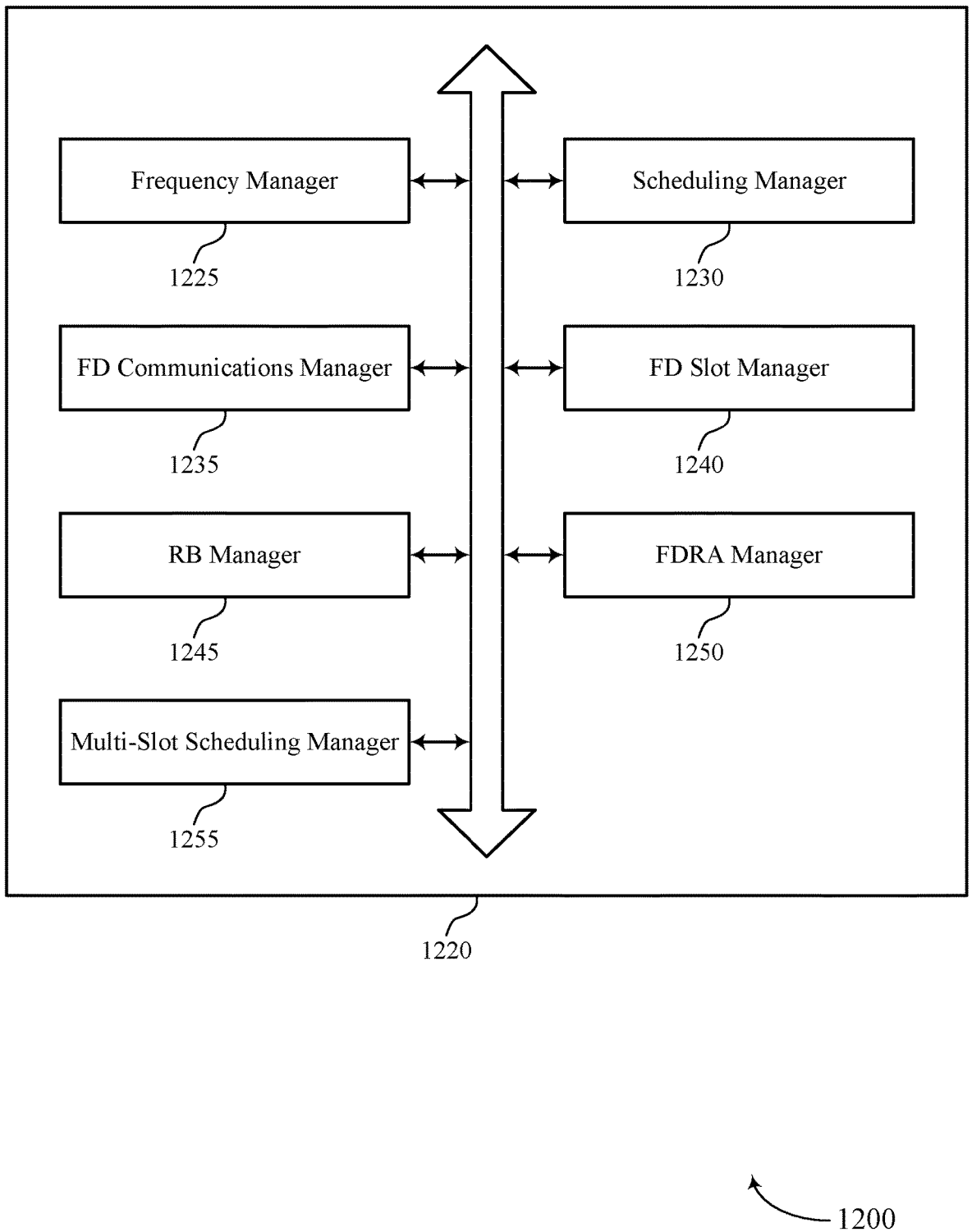
FIG. 12 shows a block diagram of a communications manager that supports TDRA scheduling multiple transmissions across subbands in accordance with one or more aspects of the present disclosure.

FIG. 12 shows a block diagram 1200 of a communications manager 1220 that supports TDRA scheduling multiple transmissions across subbands in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of TDRA scheduling multiple transmissions across subbands as described herein. For example, the communications manager 1220 may include a frequency manager 1225, a scheduling manager 1230, an FD communications manager 1235, an FD slot manager 1240, an RB manager 1245, an FDRA manager 1250, a multi-slot scheduling manager 1255, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The frequency manager 1225 may be configured as or otherwise support a means for identifying, for a UE, a first frequency resource for a first one or more RB sets associated with a first communications during a FD slot and a second frequency resource for a second one or more RB sets associated with a second communications during the FD slot. The scheduling manager 1230 may be configured as or otherwise support a means for transmitting a grant to the UE scheduling the first communications and the second communications during the FD slot, the grant including a TDRA field identifying the first frequency resource and the second frequency resource. The FD communications manager 1235 may be configured as or otherwise support a means for performing the communications with the UE during the FD slot and using the first frequency resource and the second frequency resource.

In some examples, the FD slot manager 1240 may be configured as or otherwise support a means for identifying, based on the TDRA field, a first slot index for the first communications and a second slot index for the second communications, where the grant schedules communications during the FD slot based on the first slot index and the second slot index indicating a same slot index.

In some examples, the FD slot manager 1240 may be configured as or otherwise support a means for identifying, based on the grant, a first redundancy version and a first codeword for the first communications and a second redundancy version and a second codeword for the second communications, where the second communications is a repetition of the first communications based on the first redundancy version and the second redundancy version being a same redundancy version and the first codeword and the second codeword being a same codeword.

In some examples, the FD slot manager 1240 may be configured as or otherwise support a means for identifying, based on the grant, a first redundancy version and a first codeword for the first communications and a second redundancy version and a second codeword for the second communications, where the first communications and the second communications are different communications based on the first redundancy version and the second redundancy version being different redundancy versions and the first codeword and the second codeword being different codewords.

In some examples, the FD slot manager 1240 may be configured as or otherwise support a means for identifying, based on the TDRA field, a first starting symbol during the FD slot for the first communications and a second starting symbol during the FD slot for the second communications, where the first starting symbol and the second starting symbol include a same starting symbol or a different starting symbol.

In some examples, the RB manager 1245 may be configured as or otherwise support a means for identifying, based on a FDRA field indicated in the grant, a first starting RB of the first one or more RB sets within the first frequency resource to use for the first communications, where a second starting RB of the second one or more RB sets within the second frequency resource are identified based on the first starting RB.

In some examples, the FDRA manager 1250 may be configured as or otherwise support a means for identifying, based on a first portion of a FDRA field indicated in the grant, a first starting RB of the first one or more RB sets within the first frequency resource to use for the first communications. In some examples, the FDRA manager 1250 may be configured as or otherwise support a means for identifying, based on a second portion of FDRA field, a second starting RB of the second one or more RB sets within the second frequency resource to use for the second communications.

In some examples, the multi-slot scheduling manager 1255 may be configured as or otherwise support a means for identifying, based on the grant, the first communications and the second communications scheduled during the FD slot based on a shared slot index associated with the first communications and the second communications and a third communications scheduled during a HD slot based on a slot index that is different from the shared slot index. In some examples, the first frequency resource and the second frequency resource include different subbands during a SBFD or include overlapping frequency resources during an IBFD slot.

Figure 13:
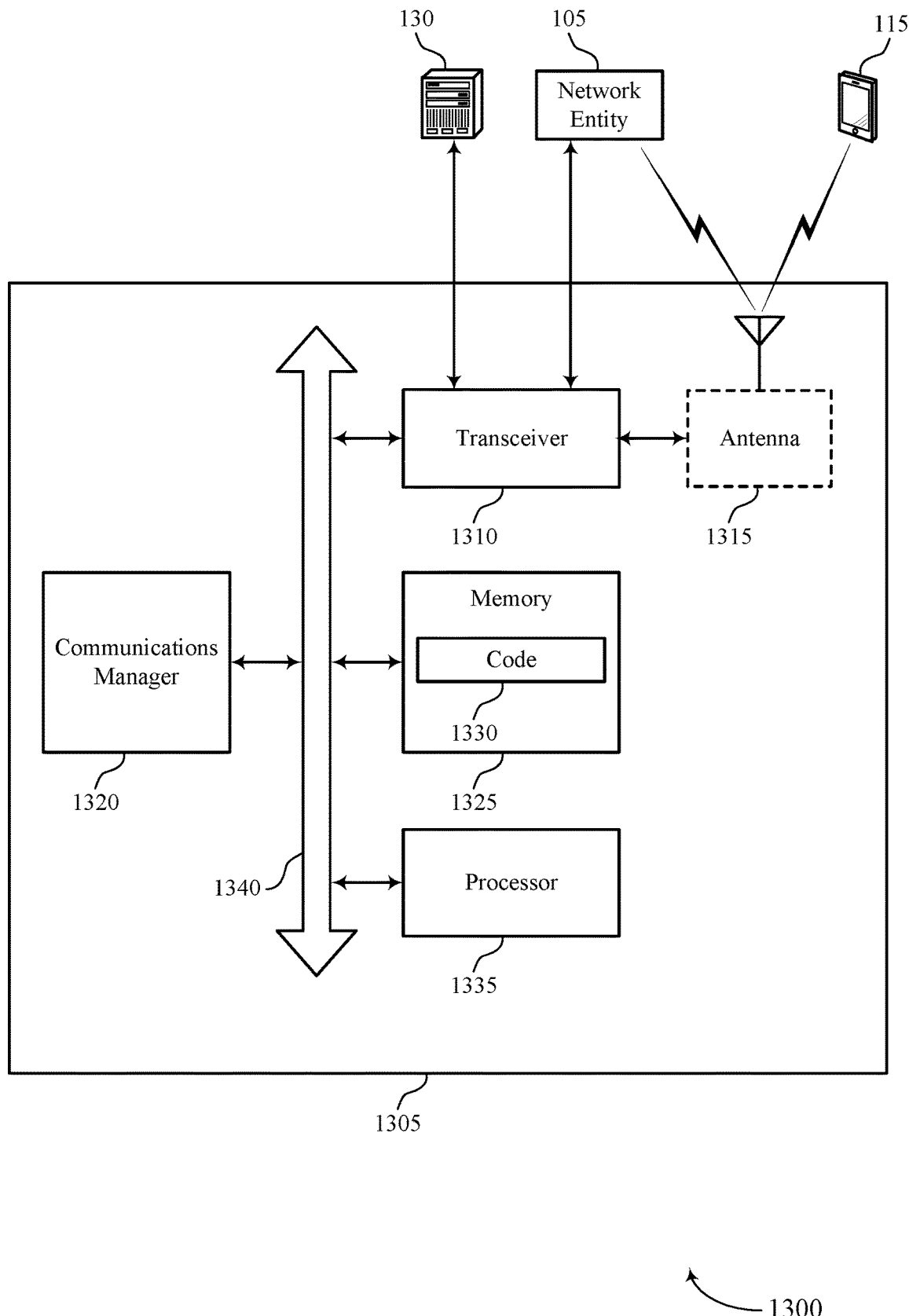
FIG. 13 shows a diagram of a system including a device that supports TDRA scheduling multiple transmissions across subbands in accordance with one or more aspects of the present disclosure.

FIG. 13 shows a diagram of a system 1300 including a device 1305 that supports TDRA scheduling multiple transmissions across subbands in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting TDRA scheduling multiple transmissions across subbands). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for identifying, for a UE, a first frequency resource for a first one or more RB sets associated with a first communications during a FD slot and a second frequency resource for a second one or more RB sets associated with a second communications during the FD slot. The communications manager 1320 may be configured as or otherwise support a means for transmitting a grant to the UE scheduling the first communications and the second communications during the FD slot, the grant including a TDRA field identifying the first frequency resource and the second frequency resource. The communications manager 1320 may be configured as or otherwise support a means for performing the communications with the UE during the FD slot and using the first frequency resource and the second frequency resource.

By including or configuring the communications manager 1320 in accordance with examples as described herein, the device 1305 may support techniques for improved scheduling of wireless communications in FD slots using the TDRA field to carry or otherwise convey an indication that the communications are scheduled in a FD slot, and accordingly the FDRA field may be interpreted relative to the subband or band in the FD slot(s).

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of TDRA scheduling multiple transmissions across subbands as described herein, or the processor 1335 and the memory 1325 may be otherwise configured to perform or support such operations.

Figure 14:
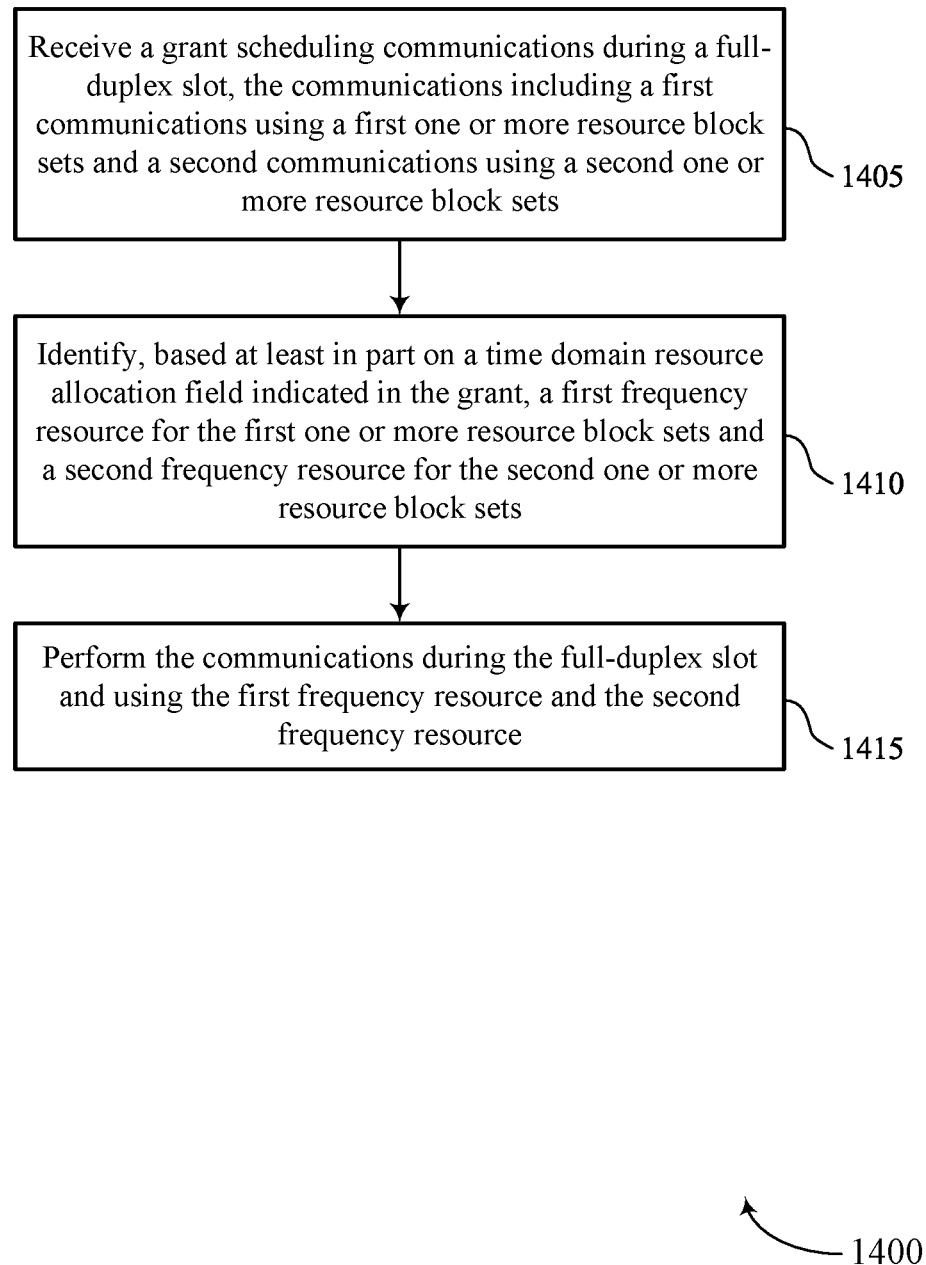
FIGS. 14 through 18 show flowcharts illustrating methods that support TDRA scheduling multiple transmissions across subbands in accordance with one or more aspects of the present disclosure.

FIG. 14 shows a flowchart illustrating a method 1400 that supports TDRA scheduling multiple transmissions across subbands in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a grant scheduling communications during a FD slot, the communications including a first communications using a first one or more RB sets and a second communications using a second one or more RB sets. The operations of 1405 may be performed in accordance with examples as disclosed herein. In some examples, aspects of the operations of 1405 may be performed by a scheduling manager 825 as described with reference to FIG. 8.

At 1410, the method may include identifying, based on a TDRA field indicated in the grant, a first frequency resource for the first one or more RB sets and a second frequency resource for the second one or more RB sets. The operations of 1410 may be performed in accordance with examples as disclosed herein. In some examples, aspects of the operations of 1410 may be performed by a frequency manager 830 as described with reference to FIG. 8.

At 1415, the method may include performing the communications during the FD slot and using the first frequency resource and the second frequency resource. The operations of 1415 may be performed in accordance with examples as disclosed herein. In some examples, aspects of the operations of 1415 may be performed by an FD communications manager 835 as described with reference to FIG. 8.

Figure 15:
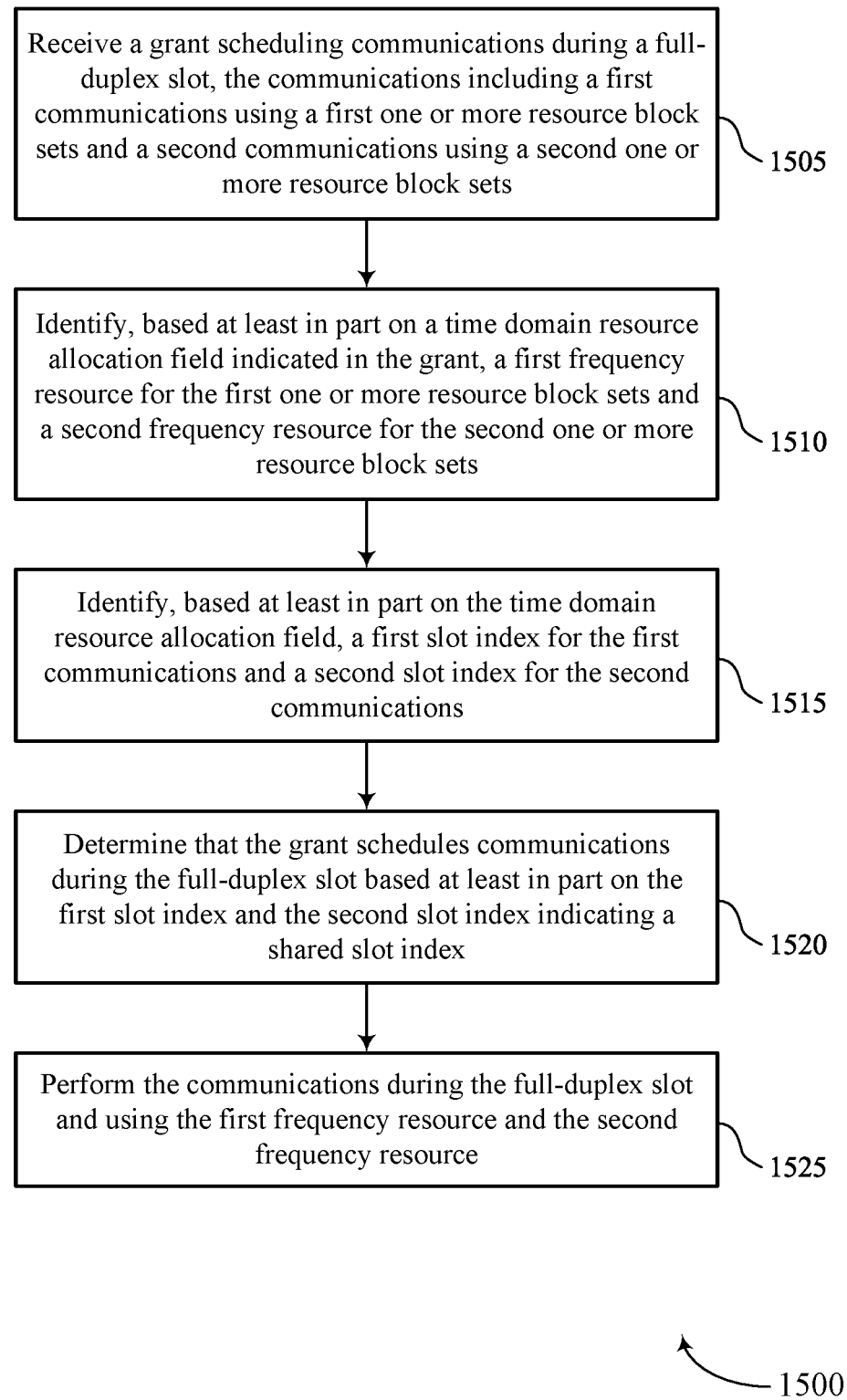

FIG. 15 shows a flowchart illustrating a method 1500 that supports TDRA scheduling multiple transmissions across subbands in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a grant scheduling communications during a FD slot, the communications including a first communications using a first one or more RB sets and a second communications using a second one or more RB sets. The operations of 1505 may be performed in accordance with examples as disclosed herein. In some examples, aspects of the operations of 1505 may be performed by a scheduling manager 825 as described with reference to FIG. 8.

At 1510, the method may include identifying, based on a TDRA field indicated in the grant, a first frequency resource for the first one or more RB sets and a second frequency resource for the second one or more RB sets. The operations of 1510 may be performed in accordance with examples as disclosed herein. In some examples, aspects of the operations of 1510 may be performed by a frequency manager 830 as described with reference to FIG. 8.

At 1515, the method may include identifying, based on the TDRA field, a first slot index for the first communications and a second slot index for the second communications. The operations of 1515 may be performed in accordance with examples as disclosed herein. In some examples, aspects of the operations of 1515 may be performed by an FD slot manager 840 as described with reference to FIG. 8.

At 1520, the method may include determining that the grant schedules communications during the FD slot based on the first slot index and the second slot index indicating a shared slot index. The operations of 1520 may be performed in accordance with examples as disclosed herein. In some examples, aspects of the operations of 1520 may be performed by an FD slot manager 840 as described with reference to FIG. 8.

At 1525, the method may include performing the communications during the FD slot and using the first frequency resource and the second frequency resource. The operations of 1525 may be performed in accordance with examples as disclosed herein. In some examples, aspects of the operations of 1525 may be performed by an FD communications manager 835 as described with reference to FIG. 8.

Figure 16:
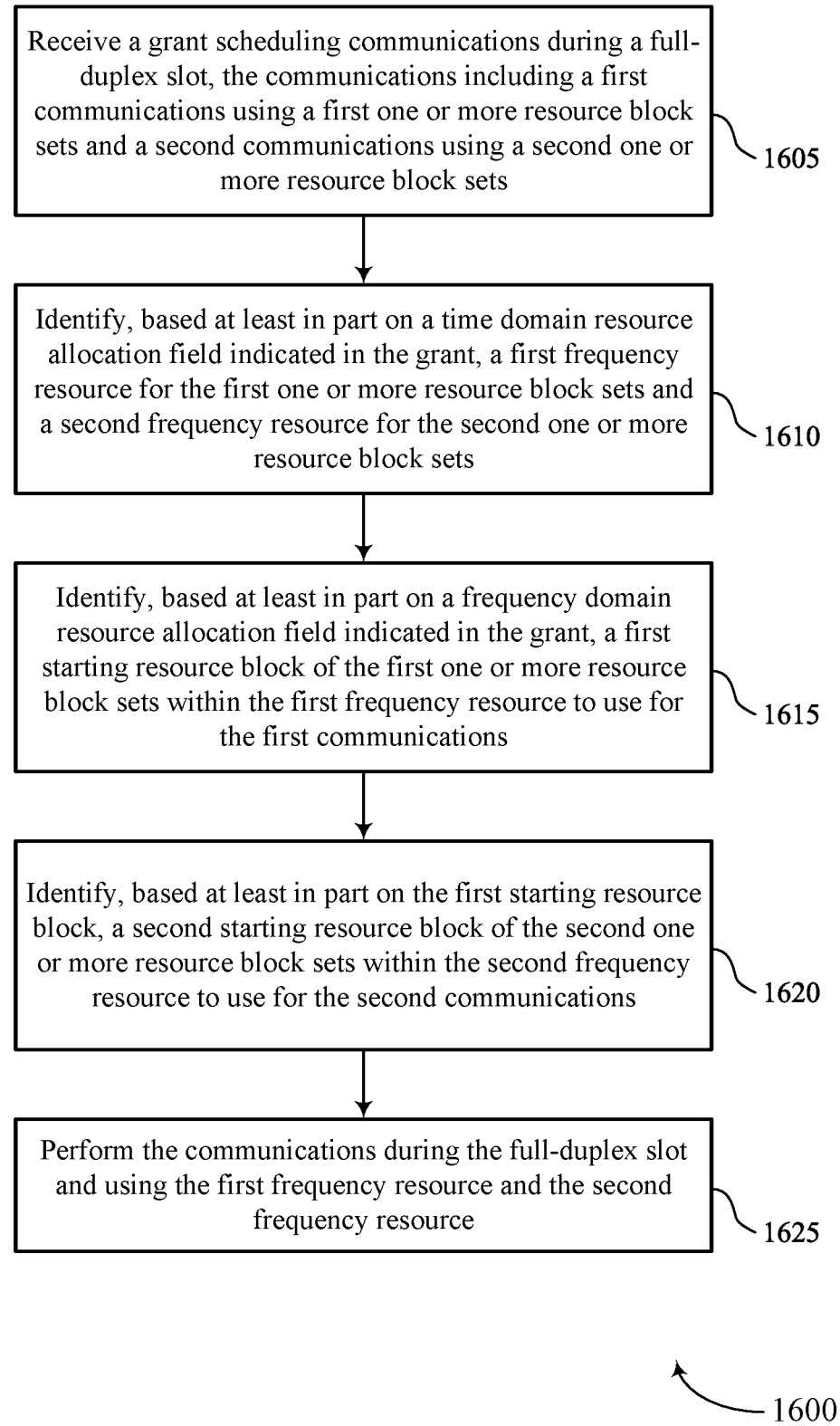

FIG. 16 shows a flowchart illustrating a method 1600 that supports TDRA scheduling multiple transmissions across subbands in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a grant scheduling communications during a FD slot, the communications including a first communications using a first one or more RB sets and a second communications using a second one or more RB sets. The operations of 1605 may be performed in accordance with examples as disclosed herein. In some examples, aspects of the operations of 1605 may be performed by a scheduling manager 825 as described with reference to FIG. 8.

At 1610, the method may include identifying, based on a TDRA field indicated in the grant, a first frequency resource for the first one or more RB sets and a second frequency resource for the second one or more RB sets. The operations of 1610 may be performed in accordance with examples as disclosed herein. In some examples, aspects of the operations of 1610 may be performed by a frequency manager 830 as described with reference to FIG. 8.

At 1615, the method may include identifying, based on a FDRA field indicated in the grant, a first starting RB of the first one or more RB sets within the first frequency resource to use for the first communications. The operations of 1615 may be performed in accordance with examples as disclosed herein. In some examples, aspects of the operations of 1615 may be performed by an RB manager 845 as described with reference to FIG. 8.

At 1620, the method may include identifying, based on the first starting RB, a second starting RB of the second one or more RB sets within the second frequency resource to use for the second communications. The operations of 1620 may be performed in accordance with examples as disclosed herein. In some examples, aspects of the operations of 1620 may be performed by an RB manager 845 as described with reference to FIG. 8.

At 1625, the method may include performing the communications during the FD slot and using the first frequency resource and the second frequency resource. The operations of 1625 may be performed in accordance with examples as disclosed herein. In some examples, aspects of the operations of 1625 may be performed by an FD communications manager 835 as described with reference to FIG. 8.

Figure 17:
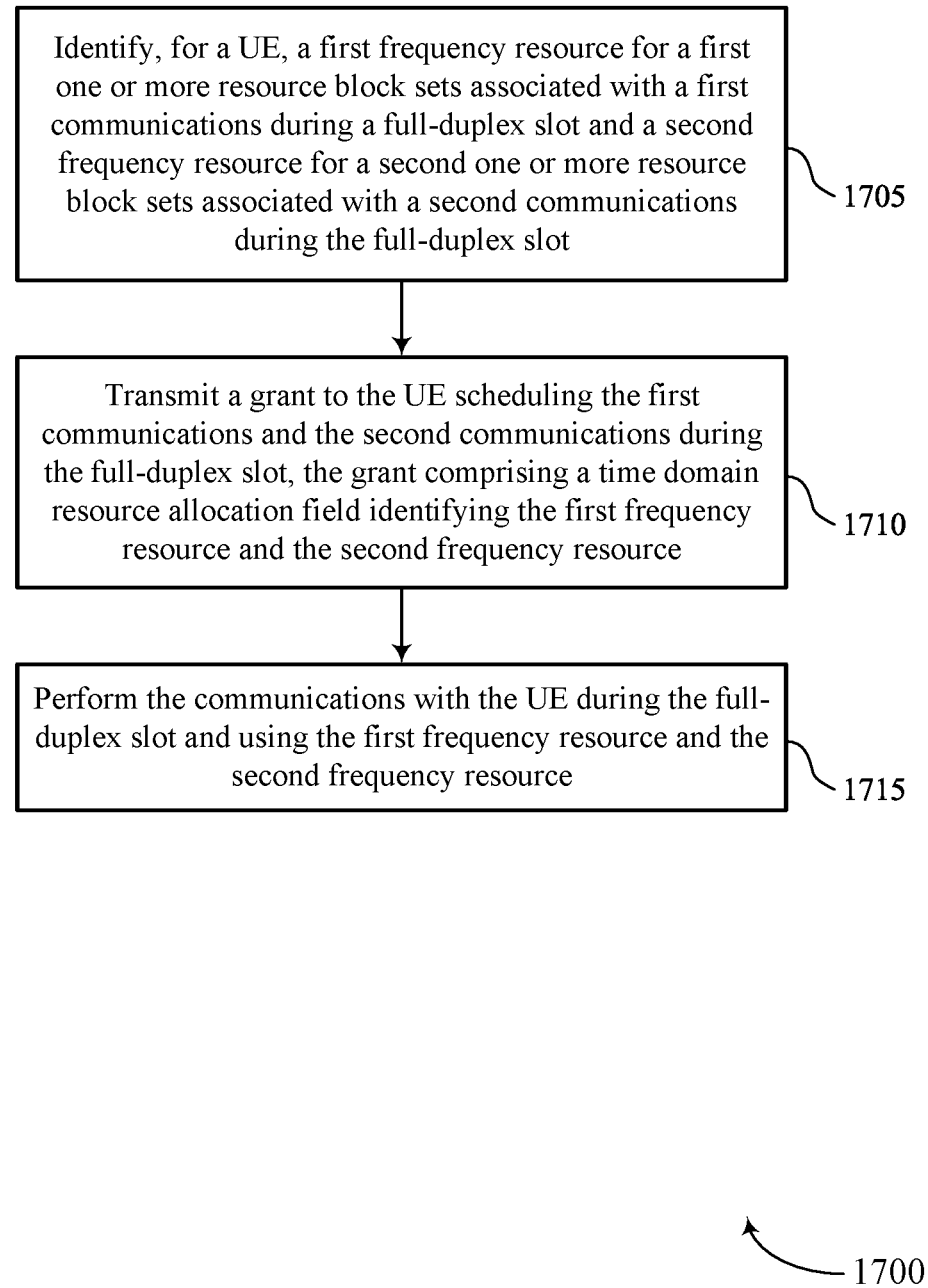

FIG. 17 shows a flowchart illustrating a method 1700 that supports TDRA scheduling multiple transmissions across subbands in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include identifying, for a UE, a first frequency resource for a first one or more RB sets associated with a first communications during a FD slot and a second frequency resource for a second one or more RB sets associated with a second communications during the FD slot. The operations of 1705 may be performed in accordance with examples as disclosed herein. In some examples, aspects of the operations of 1705 may be performed by a frequency manager 1225 as described with reference to FIG. 12.

At 1710, the method may include transmitting a grant to the UE scheduling the first communications and the second communications during the FD slot, the grant including a TDRA field identifying the first frequency resource and the second frequency resource. The operations of 1710 may be performed in accordance with examples as disclosed herein. In some examples, aspects of the operations of 1710 may be performed by a scheduling manager 1230 as described with reference to FIG. 12.

At 1715, the method may include performing the communications with the UE during the FD slot and using the first frequency resource and the second frequency resource. The operations of 1715 may be performed in accordance with examples as disclosed herein. In some examples, aspects of the operations of 1715 may be performed by an FD communications manager 1235 as described with reference to FIG. 12.

Figure 18:
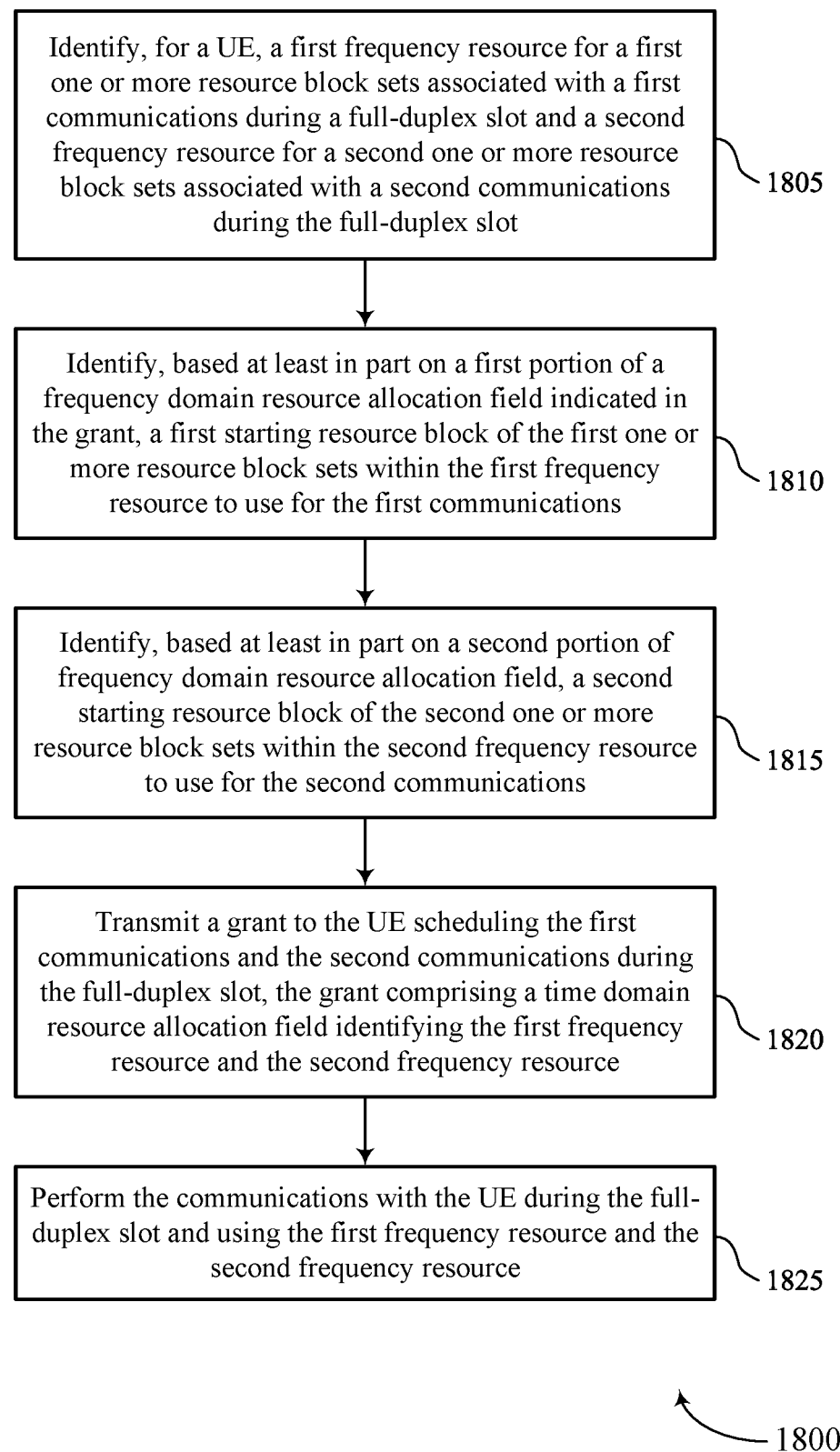

FIG. 18 shows a flowchart illustrating a method 1800 that supports TDRA scheduling multiple transmissions across subbands in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include identifying, for a UE, a first frequency resource for a first one or more RB sets associated with a first communications during a FD slot and a second frequency resource for a second one or more RB sets associated with a second communications during the FD slot. The operations of 1805 may be performed in accordance with examples as disclosed herein. In some examples, aspects of the operations of 1805 may be performed by a frequency manager 1225 as described with reference to FIG. 12.

At 1810, the method may include identifying, based on a first portion of a FDRA field indicated in the grant, a first starting RB of the first one or more RB sets within the first frequency resource to use for the first communications. The operations of 1810 may be performed in accordance with examples as disclosed herein. In some examples, aspects of the operations of 1810 may be performed by an FDRA manager 1250 as described with reference to FIG. 12.

At 1815, the method may include identifying, based on a second portion of FDRA field, a second starting RB of the second one or more RB sets within the second frequency resource to use for the second communications. The operations of 1815 may be performed in accordance with examples as disclosed herein. In some examples, aspects of the operations of 1815 may be performed by an FDRA manager 1250 as described with reference to FIG. 12.

At 1820, the method may include transmitting a grant to the UE scheduling the first communications and the second communications during the FD slot, the grant including a TDRA field identifying the first frequency resource and the second frequency resource. The operations of 1820 may be performed in accordance with examples as disclosed herein. In some examples, aspects of the operations of 1820 may be performed by a scheduling manager 1230 as described with reference to FIG. 12.

At 1825, the method may include performing the communications with the UE during the FD slot and using the first frequency resource and the second frequency resource. The operations of 1825 may be performed in accordance with examples as disclosed herein. In some examples, aspects of the operations of 1825 may be performed by an FD communications manager 1235 as described with reference to FIG. 12.

The following provides an overview of aspects of the present disclosure:

Aspect 1: A method for wireless communications at a UE, comprising: receiving a grant scheduling communications during a FD slot, the communications including a first communications using a first one or more RB sets and a second communications using a second one or more RB sets; identifying, based at least in part on a TDRA field indicated in the grant, a first frequency resource for the first one or more RB sets and a second frequency resource for the second one or more RB sets; and performing the communications during the FD slot and using the first frequency resource and the second frequency resource.

Aspect 2: The method of aspect 1, further comprising: identifying, based at least in part on the TDRA field, a first slot index for the first communications and a second slot index for the second communications; and determining that the grant schedules communications during the FD slot based at least in part on the first slot index and the second slot index indicating a shared slot index.

Aspect 3: The method of aspect 2, further comprising: identifying, based at least in part on the grant, a first redundancy version and a first codeword for the first communications and a second redundancy version and a second codeword for the second communications; and determining that the second communications is a repetition of the first communications based at least in part on the first redundancy version and the second redundancy version being a same redundancy version and the first codeword and the second codeword being a same codeword.

Aspect 4: The method of any of aspects 2 through 3, further comprising: identifying, based at least in part on the grant, a first redundancy version and a first codeword for the first communications and a second redundancy version and a second codeword for the second communications; and determining that the first communications and the second communications are different communications based at least in part on the first redundancy version and the second redundancy version being different redundancy versions and the first codeword and the second codeword being different codewords.

Aspect 5: The method of any of aspects 2 through 4, further comprising: identifying, based at least in part on the TDRA field, a first starting symbol during the FD slot for the first communications and a second starting symbol during the FD slot for the second communications, wherein the first starting symbol and the second starting symbol comprise a same starting symbol or a different starting symbol.

Aspect 6: The method of any of aspects 1 through 5, further comprising: identifying, based at least in part on a FDRA field indicated in the grant, a first starting RB of the first one or more RB sets within the first frequency resource to use for the first communications; and identifying, based at least in part on the first starting RB, a second starting RB of the second one or more RB sets within the second frequency resource to use for the second communications.

Aspect 7: The method of any of aspects 1 through 6, further comprising: identifying, based at least in part on a first portion of a FDRA field indicated in the grant, a first starting RB of the first one or more RB sets within the first frequency resource to use for the first communications; and identifying, based at least in part on a second portion of FDRA field, a second starting RB of the second one or more RB sets within the second frequency resource to use for the second communications.

Aspect 8: The method of any of aspects 1 through 7, further comprising: identifying, based at least in part on the grant, the first communications and the second communications scheduled during the FD slot based at least in part on a shared slot index associated with the first communications and the second communications and a third communications scheduled during a half-duplex slot based at least in part on a slot index that is different from the shared slot index.

Aspect 9: The method of any of aspects 1 through 8, wherein the first frequency resource and the second frequency resource comprise different subbands during a SBFD or comprise overlapping frequency resources during an IBFD slot.

Aspect 10: A method for wireless communications at a network entity, comprising: identifying, for a UE, a first frequency resource for a first one or more RB sets associated with a first communications during a FD slot and a second frequency resource for a second one or more RB sets associated with a second communications during the FD slot; transmitting a grant to the UE scheduling the first communications and the second communications during the FD slot, the grant comprising a TDRA field identifying the first frequency resource and the second frequency resource; and performing the communications with the UE during the FD slot and using the first frequency resource and the second frequency resource.

Aspect 11: The method of aspect 10, further comprising: identifying, based at least in part on the TDRA field, a first slot index for the first communications and a second slot index for the second communications, wherein the grant schedules communications during the FD slot based at least in part on the first slot index and the second slot index indicating a same slot index.

Aspect 12: The method of aspect 11, further comprising: identifying, based at least in part on the grant, a first redundancy version and a first codeword for the first communications and a second redundancy version and a second codeword for the second communications, wherein the second communications is a repetition of the first communications based at least in part on the first redundancy version and the second redundancy version being a same redundancy version and the first codeword and the second codeword being a same codeword.

Aspect 13: The method of any of aspects 11 through 12, further comprising: identifying, based at least in part on the grant, a first redundancy version and a first codeword for the first communications and a second redundancy version and a second codeword for the second communications, wherein the first communications and the second communications are different communications based at least in part on the first redundancy version and the second redundancy version being different redundancy versions and the first codeword and the second codeword being different codewords.

Aspect 14: The method of any of aspects 11 through 13, further comprising: identifying, based at least in part on the TDRA field, a first starting symbol during the FD slot for the first communications and a second starting symbol during the FD slot for the second communications, wherein the first starting symbol and the second starting symbol comprise a same starting symbol or a different starting symbol.

Aspect 15: The method of any of aspects 10 through 14, further comprising: identifying, based at least in part on a FDRA field indicated in the grant, a first starting RB of the first one or more RB sets within the first frequency resource to use for the first communications, wherein a second starting RB of the second one or more RB sets within the second frequency resource are identified based at least in part on the first starting RB.

Aspect 16: The method of any of aspects 10 through 15, further comprising: identifying, based at least in part on a first portion of a FDRA field indicated in the grant, a first starting RB of the first one or more RB sets within the first frequency resource to use for the first communications; and identifying, based at least in part on a second portion of FDRA field, a second starting RB of the second one or more RB sets within the second frequency resource to use for the second communications.

Aspect 17: The method of any of aspects 10 through 16, further comprising: identifying, based at least in part on the grant, the first communications and the second communications scheduled during the FD slot based at least in part on a shared slot index associated with the first communications and the second communications and a third communications scheduled during a half-duplex slot based at least in part on a slot index that is different from the shared slot index.

Aspect 18: The method of any of aspects 10 through 17, wherein the first frequency resource and the second frequency resource comprise different subbands during a SBFD or comprise overlapping frequency resources during an IBFD slot.

Aspect 19: An apparatus for wireless communications at a UE, comprising a processor; memory coupled with the processor; and instructions stored in the memory and executable by the processor to cause the apparatus to perform a method of any of aspects 1 through 9.

Aspect 20: An apparatus for wireless communications at a UE, comprising at least one means for performing a method of any of aspects 1 through 9.

Aspect 21: A non-transitory computer-readable medium storing code for wireless communications at a UE, the code comprising instructions executable by a processor to perform a method of any of aspects 1 through 9.

Aspect 22: An apparatus for wireless communications at a network entity, comprising a processor; memory coupled with the processor; and instructions stored in the memory and executable by the processor to cause the apparatus to perform a method of any of aspects 10 through 18.

Aspect 23: An apparatus for wireless communications at a network entity, comprising at least one means for performing a method of any of aspects 10 through 18.

Aspect 24: A non-transitory computer-readable medium storing code for wireless communications at a network entity, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
  a processor;
  memory coupled with the processor; and
  instructions stored in the memory and executable by the processor to cause the apparatus to:
    receive a grant scheduling communications during a full-duplex slot, the communications including a first communications using a first one or more resource block sets and a second communications using a second one or more resource block sets;
    identify, based at least in part on respective slot index values associated with the first communications and the second communications indicated in a time domain resource allocation field in the grant, a first frequency resource for the first one or more resource block sets and a second frequency resource for the second one or more resource block sets; and
    perform the communications during the full-duplex slot and using the first frequency resource and the second frequency resource.

2. The apparatus of claim 1, wherein the instructions are further executable by the processor to cause the apparatus to:
  identify, based at least in part on the time domain resource allocation field, a first slot index for the first communications and a second slot index for the second communications; and
  determine that the grant schedules communications during the full-duplex slot based at least in part on the first slot index and the second slot index indicating a shared slot index.

3. The apparatus of claim 2, wherein the instructions are further executable by the processor to cause the apparatus to:
  identify, based at least in part on the grant, a first redundancy version and a first codeword for the first communications and a second redundancy version and a second codeword for the second communications; and determine that the second communications is a repetition of the first communications based at least in part on the first redundancy version and the second redundancy version being a same redundancy version and the first codeword and the second codeword being a same codeword.

4. The apparatus of claim 2, wherein the instructions are further executable by the processor to cause the apparatus to:
identify, based at least in part on the grant, a first redundancy version and a first codeword for the first communications and a second redundancy version and a second codeword for the second communications; and
determine that the first communications and the second communications are different communications based at least in part on the first redundancy version and the second redundancy version being different redundancy versions and the first codeword and the second codeword being different codewords.

5. The apparatus of claim 2, wherein the instructions are further executable by the processor to cause the apparatus to:
identify, based at least in part on the time domain resource allocation field, a first starting symbol during the full-duplex slot for the first communications and a second starting symbol during the full-duplex slot for the second communications, wherein the first starting symbol and the second starting symbol comprise a same starting symbol or a different starting symbol.

6. The apparatus of claim 1, wherein the instructions are further executable by the processor to cause the apparatus to:
identify, based at least in part on a frequency domain resource allocation field indicated in the grant, a first starting resource block of the first one or more resource block sets within the first frequency resource to use for the first communications; and
identify, based at least in part on the first starting resource block, a second starting resource block of the second one or more resource block sets within the second frequency resource to use for the second communications.

7. The apparatus of claim 1, wherein the instructions are further executable by the processor to cause the apparatus to:
identify, based at least in part on a first portion of a frequency domain resource allocation field indicated in the grant, a first starting resource block of the first one or more resource block sets within the first frequency resource to use for the first communications; and
identify, based at least in part on a second portion of the frequency domain resource allocation field, a second starting resource block of the second one or more resource block sets within the second frequency resource to use for the second communications.

8. The apparatus of claim 1, wherein the instructions are further executable by the processor to cause the apparatus to:
identify, based at least in part on the grant, the first communications and the second communications scheduled during the full-duplex slot based at least in part on a shared slot index associated with the first communications and the second communications and a third communications scheduled during a half-duplex slot based at least in part on a slot index that is different from the shared slot index.

9. The apparatus of claim 1, wherein the first frequency resource and the second frequency resource comprise different subbands during a subband full-duplex (SBFD) or comprise overlapping frequency resources during an in-band full-duplex (IBFD) slot.

10. An apparatus for wireless communications at a network entity, comprising:
a processor;
memory coupled with the processor; and
instructions stored in the memory and executable by the processor to cause the apparatus to:
identify, for a user equipment (UE), a first frequency resource for a first one or more resource block sets associated with a first communications during a full-duplex slot and a second frequency resource for a second one or more resource block sets associated with a second communications during the full-duplex slot;
transmit a grant to the UE scheduling the first communications and the second communications during the full-duplex slot, the grant comprising respective slot index values associated with the first communications and the second communications indicated in a time domain resource allocation field identifying the first frequency resource and the second frequency resource; and
perform the first communications and the second communications with the UE during the full-duplex slot and using the first frequency resource and the second frequency resource.

11. The apparatus of claim 10, wherein the instructions are further executable by the processor to cause the apparatus to:
identify, based at least in part on the time domain resource allocation field, a first slot index for the first communications and a second slot index for the second communications, wherein the grant schedules communications during the full-duplex slot based at least in part on the first slot index and the second slot index indicating a same slot index.

12. The apparatus of claim 11, wherein the instructions are further executable by the processor to cause the apparatus to:
identify, based at least in part on the grant, a first redundancy version and a first codeword for the first communications and a second redundancy version and a second codeword for the second communications, wherein the second communications is a repetition of the first communications based at least in part on the first redundancy version and the second redundancy version being a same redundancy version and the first codeword and the second codeword being a same codeword.

13. The apparatus of claim 11, wherein the instructions are further executable by the processor to cause the apparatus to:
identify, based at least in part on the grant, a first redundancy version and a first codeword for the first communications and a second redundancy version and a second codeword for the second communications, wherein the first communications and the second communications are different communications based at least in part on the first redundancy version and the second redundancy version being different redundancy versions and the first codeword and the second codeword being different codewords.

14. The apparatus of claim 11, wherein the instructions are further executable by the processor to cause the apparatus to:
identify, based at least in part on the time domain resource allocation field, a first starting symbol during the full-duplex slot for the first communications and a second starting symbol during the full-duplex slot for the second communications, wherein the first starting symbol and the second starting symbol comprise a same starting symbol or a different starting symbol.

15. The apparatus of claim 10, wherein the instructions are further executable by the processor to cause the apparatus to:
identify, based at least in part on a frequency domain resource allocation field indicated in the grant, a first starting resource block of the first one or more resource block sets within the first frequency resource to use for the first communications, wherein a second starting resource block of the second one or more resource block sets within the second frequency resource are identified based at least in part on the first starting resource block.

16. The apparatus of claim 10, wherein the instructions are further executable by the processor to cause the apparatus to:
identify, based at least in part on a first portion of a frequency domain resource allocation field indicated in the grant, a first starting resource block of the first one or more resource block sets within the first frequency resource to use for the first communications; and
identify, based at least in part on a second portion of the frequency domain resource allocation field, a second starting resource block of the second one or more resource block sets within the second frequency resource to use for the second communications.

17. The apparatus of claim 10, wherein the instructions are further executable by the processor to cause the apparatus to:
identify, based at least in part on the grant, the first communications and the second communications scheduled during the full-duplex slot based at least in part on a shared slot index associated with the first communications and the second communications and a third communications scheduled during a half-duplex slot based at least in part on a slot index that is different from the shared slot index.

18. The apparatus of claim 10, wherein the first frequency resource and the second frequency resource comprise different subbands during a subband full-duplex (SBFD) or comprise overlapping frequency resources during an in-band full-duplex (IBFD) slot.

19. A method for wireless communications at a user equipment (UE), comprising:
receiving a grant scheduling communications during a full-duplex slot, the communications including a first communications using a first one or more resource block sets and a second communications using a second one or more resource block sets;
identifying, based at least in part on respective slot index values associated with the first communications and the second communications indicated in a time domain resource allocation field in the grant, a first frequency resource for the first one or more resource block sets and a second frequency resource for the second one or more resource block sets; and
performing the communications during the full-duplex slot and using the first frequency resource and the second frequency resource.

20. The method of claim 19, further comprising:
identifying, based at least in part on the time domain resource allocation field, a first slot index for the first communications and a second slot index for the second communications; and
determining that the grant schedules communications during the full-duplex slot based at least in part on the first slot index and the second slot index indicating a shared slot index.

21. The method of claim 20, further comprising:
identifying, based at least in part on the grant, a first redundancy version and a first codeword for the first communications and a second redundancy version and a second codeword for the second communications; and
determining that the second communications is a repetition of the first communications based at least in part on the first redundancy version and the second redundancy version being a same redundancy version and the first codeword and the second codeword being a same codeword.

22. The method of claim 20, further comprising:
identifying, based at least in part on the grant, a first redundancy version and a first codeword for the first communications and a second redundancy version and a second codeword for the second communications; and
determining that the first communications and the second communications are different communications based at least in part on the first redundancy version and the second redundancy version being different redundancy versions and the first codeword and the second codeword being different codewords.

23. The method of claim 20, further comprising:
identifying, based at least in part on the time domain resource allocation field, a first starting symbol during the full-duplex slot for the first communications and a second starting symbol during the full-duplex slot for the second communications, wherein the first starting symbol and the second starting symbol comprise a same starting symbol or a different starting symbol.

24. The method of claim 19, further comprising:
identifying, based at least in part on a frequency domain resource allocation field indicated in the grant, a first starting resource block of the first one or more resource block sets within the first frequency resource to use for the first communications; and
identifying, based at least in part on the first starting resource block, a second starting resource block of the second one or more resource block sets within the second frequency resource to use for the second communications.

25. The method of claim 19, further comprising:
identifying, based at least in part on a first portion of a frequency domain resource allocation field indicated in the grant, a first starting resource block of the first one or more resource block sets within the first frequency resource to use for the first communications; and
identifying, based at least in part on a second portion of the frequency domain resource allocation field, a second starting resource block of the second one or more resource block sets within the second frequency resource to use for the second communications.

26. The method of claim 19, further comprising:
identifying, based at least in part on the grant, the first communications and the second communications scheduled during the full-duplex slot based at least in part on a shared slot index associated with the first communications and the second communications and a third communications scheduled during a half-duplex slot based at least in part on a slot index that is different from the shared slot index.

27. The method of claim 19, wherein the first frequency resource and the second frequency resource comprise different subbands during a subband full-duplex (SBFD) or comprise overlapping frequency resources during an in-band full-duplex (IBFD) slot.

28. A method for wireless communications at a network entity, comprising:

identifying, for a user equipment (UE), a first frequency resource for a first one or more resource block sets associated with a first communications during a full-duplex slot and a second frequency resource for a second one or more resource block sets associated with a second communications during the full-duplex slot;

transmitting a grant to the UE scheduling the first communications and the second communications during the full-duplex slot, the grant comprising respective slot index values associated with the first communications and the second communications indicated in a time domain resource allocation field identifying the first frequency resource and the second frequency resource; and performing the first communications and the second communications with the UE during the full-duplex slot and using the first frequency resource and the second frequency resource.

29. The method of claim 28, further comprising:

identifying, based at least in part on the time domain resource allocation field, a first slot index for the first communications and a second slot index for the second communications, wherein the grant schedules communications during the full-duplex slot based at least in part on the first slot index and the second slot index indicating a same slot index.

30. The method of claim 29, further comprising:

identifying, based at least in part on the grant, a first redundancy version and a first codeword for the first communications and a second redundancy version and a second codeword for the second communications, wherein the second communications is a repetition of the first communications based at least in part on the first redundancy version and the second redundancy version being a same redundancy version and the first codeword and the second codeword being a same codeword.

* * * * *